United States Patent
Furihata et al.

(10) Patent No.: US 7,701,622 B2
(45) Date of Patent: Apr. 20, 2010

(54) MEDIA PROCESSING APPARATUS AND SCANNER UNIT

(75) Inventors: Hideki Furihata, Okaya (JP); Katsuyuki Endo, Matsumoto (JP); Sadao Murata, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 253 days.

(21) Appl. No.: 11/879,234

(22) Filed: Jul. 16, 2007

(65) Prior Publication Data

US 2007/0291328 A1 Dec. 20, 2007

Related U.S. Application Data

(62) Division of application No. 11/286,858, filed on Nov. 22, 2005, now Pat. No. 7,258,500.

(30) Foreign Application Priority Data

Dec. 1, 2004 (JP) ............................. 2004-348231

(51) Int. Cl.
H04N 1/06 (2006.01)

(52) U.S. Cl. ..................................... 358/498

(58) Field of Classification Search ................ 358/471, 358/474, 498
See application file for complete search history.

(56) References Cited

U.S. PATENT DOCUMENTS

| | | | | | |
|---|---|---|---|---|---|
| 2,773,446 | A | * | 12/1956 | Koeber, Jr. .................. | 101/233 |
| 4,335,954 | A | * | 6/1982 | Phelps ......................... | 399/372 |
| 4,410,897 | A | * | 10/1983 | Moriguchi et al. .......... | 347/173 |
| 4,475,128 | A | * | 10/1984 | Koumura ..................... | 358/296 |
| 4,621,801 | A | * | 11/1986 | Sanchez ...................... | 271/251 |
| 4,692,041 | A | * | 9/1987 | Dyma et al. .................. | 400/82 |
| 5,018,889 | A | * | 5/1991 | Oyaide et al. ............... | 400/642 |
| 5,080,513 | A | * | 1/1992 | Clary .......................... | 400/591 |
| 5,519,484 | A | * | 5/1996 | Kumagai ..................... | 399/364 |
| 5,677,722 | A | * | 10/1997 | Park ............................ | 347/218 |
| 5,745,253 | A | * | 4/1998 | Muramatsu et al. ......... | 358/408 |
| 5,781,823 | A | * | 7/1998 | Isobe et al. .................. | 399/2 |
| 5,852,977 | A | * | 12/1998 | Lynch ......................... | 101/232 |
| 5,863,139 | A | * | 1/1999 | Asai et al. .................. | 400/248.1 |
| 5,882,130 | A | * | 3/1999 | Kumazaki et al. ........... | 400/642 |
| 6,103,985 | A | * | 8/2000 | Shell et al. .................. | 209/587 |
| 6,129,270 | A | * | 10/2000 | Piazza ......................... | 235/379 |
| 6,145,834 | A | * | 11/2000 | Hirota et al. ................ | 271/225 |
| 6,203,223 | B1 | * | 3/2001 | Nakayama et al. .......... | 400/605 |
| 6,257,783 | B1 | * | 7/2001 | Hanaoka et al. ............. | 400/578 |

(Continued)

FOREIGN PATENT DOCUMENTS

JP 07-271880 10/1995

(Continued)

*Primary Examiner*—Huan H Tran
(74) *Attorney, Agent, or Firm*—Nutter McClennen & Fish LLP; John J. Penny, Jr.; Rory P. Pheiffer

(57) ABSTRACT

A scanner unit that includes a scanner for imaging a print medium, a base that supports the scanner, a pressure feed roller disposed opposite the scanning surface of the scanner, a guide member for guiding the print medium to the scanner, a frame member that is supported pivotably to the base, and a motor that is supported on the base. The frame member supports the pressure feed roller and guide member and the motor drives the pressure feed roller.

6 Claims, 18 Drawing Sheets

U.S. PATENT DOCUMENTS

| | | | |
|---|---|---|---|
| 6,288,768 B1* | 9/2001 | Ichinose et al. | 355/23 |
| 6,350,005 B1 | 2/2002 | Asai et al. | |
| 6,354,589 B1* | 3/2002 | Taruki et al. | 271/265.01 |
| 6,361,163 B1* | 3/2002 | Fowlkes | 347/104 |
| 6,447,182 B2* | 9/2002 | Brewington et al. | 400/188 |
| 6,523,927 B2 | 2/2003 | Asai et al. | |
| 6,585,258 B1* | 7/2003 | Hirota et al. | 271/186 |
| 6,695,427 B2 | 2/2004 | Murata et al. | |
| 6,764,236 B2* | 7/2004 | Suzuki | 400/642 |
| 6,796,559 B2* | 9/2004 | Hirota et al. | 271/225 |
| 6,832,723 B2* | 12/2004 | Murata et al. | 235/439 |
| 6,862,428 B2* | 3/2005 | Sasaki | 399/401 |
| 6,902,105 B2* | 6/2005 | Koakutsu | 235/379 |
| 6,926,272 B2* | 8/2005 | Carter et al. | 271/258.01 |
| 6,942,213 B2* | 9/2005 | Endo et al. | 271/186 |
| 7,019,873 B2* | 3/2006 | Tohyama et al. | 358/496 |
| 7,051,928 B2* | 5/2006 | Kallin | 235/379 |
| 7,056,047 B2* | 6/2006 | Sasaki et al. | 400/607.2 |
| 7,064,874 B2* | 6/2006 | Imai | 358/498 |
| 7,108,368 B2* | 9/2006 | Saito et al. | 347/104 |
| 7,258,500 B2* | 8/2007 | Furihata et al. | 400/188 |
| 2001/0007621 A1* | 7/2001 | Mogi | 400/630 |
| 2002/0071702 A1* | 6/2002 | Nose et al. | 399/374 |
| 2002/0081120 A1* | 6/2002 | Oberhoffner | 399/2 |
| 2002/0158404 A1* | 10/2002 | Carter et al. | 271/186 |
| 2002/0195492 A1* | 12/2002 | Murata et al. | 235/440 |
| 2003/0047609 A1 | 3/2003 | Endo et al. | |
| 2003/0068077 A1* | 4/2003 | Koakutsu et al. | 382/135 |
| 2003/0075596 A1* | 4/2003 | Koakutsu | 235/379 |
| 2003/0218783 A1* | 11/2003 | Endo et al. | 358/474 |
| 2004/0005159 A1* | 1/2004 | Ito et al. | 399/50 |
| 2004/0184120 A1* | 9/2004 | Araki et al. | 358/497 |
| 2004/0190970 A1* | 9/2004 | Sasaki et al. | 400/582 |
| 2005/0012967 A1* | 1/2005 | Okamura | 358/474 |
| 2005/0033695 A1* | 2/2005 | Minowa | 705/45 |
| 2005/0057783 A1* | 3/2005 | Kasuga et al. | 358/446 |
| 2005/0069335 A1* | 3/2005 | Ito et al. | 399/50 |
| 2005/0122544 A1* | 6/2005 | Mizuhashi et al. | 358/1.18 |
| 2005/0127182 A1* | 6/2005 | Nagata et al. | 235/454 |
| 2005/0129440 A1* | 6/2005 | Nagata et al. | 399/405 |
| 2005/0158091 A1* | 7/2005 | Oya et al. | 399/367 |
| 2005/0252975 A1* | 11/2005 | Furihata et al. | 235/475 |
| 2006/0115312 A1* | 6/2006 | Furihata et al. | 400/149 |

FOREIGN PATENT DOCUMENTS

| | | |
|---|---|---|
| JP | 09-282388 | 10/1997 |
| JP | 2003-6713 | 1/2003 |
| JP | 2003-8803 | 1/2003 |
| JP | 2003-60851 | 2/2003 |
| JP | 2003-87496 | 3/2003 |
| JP | 2003-87497 | 3/2003 |

* cited by examiner ized ink character recognition (MICR) processing of# MEDIA PROCESSING APPARATUS AND SCANNER UNIT Japanese Patent Application 2004-348231 filed on Dec. 1, 2004 is hereby incorporated by reference in its entirety.

BACKGROUND OF THE INVENTION

1. Field of Technology

The present invention relates to a media processing apparatus such as a hybrid check processing apparatus capable of magnetic ink character recognition (MICR) processing of magnetic ink characters on a check or other negotiable instrument, as well as scanning and imaging the printed side of the same negotiable instrument, and to a scanner unit used in this media processing apparatus.

2. Description of Related Art

Checks are used for payment in business transactions, retail store purchases, restaurants, and other venues. A bank code, account number, and other information is printed in magnetic ink characters in a specific location on each check. In a retail purchase, for example, the payer writes the payee and the check amount in both numbers and words, then signs and gives the check to the checkout clerk. The store reads the bank code, account number, and other information printed in magnetic ink characters and uses this information to query the bank or check clearinghouse to determine if the check is valid. If the check is valid, the check is accepted from the customer and an endorsement is recorded on the back of the check.

After in-store processing, the check is delivered to the bank or clearinghouse for final transaction processing. More recently, electronic data representing the transaction content and a digital image captured by scanning the check after all transaction information is completed is electrically transmitted to the bank or clearinghouse, thus enabling more efficient transaction processing. Hybrid processing apparatuses that can efficiently read the magnetic ink characters as well as image the check are also available. See, for example, JP-A-2003-6713.

However, when digital data is exchanged instead of physically transporting the check, images of both front and back sides of the check must be captured precisely and transmitted because of the need to precisely and accurately identify each check. When an apparatus having only one scanner is used, such as with the hybrid processing apparatus taught in JP-A-2003-6713, the check must be inserted once to scan one side and then reinserted to scan the other side in order to image both sides of the check. This is time consuming and tedious. Furthermore, this process is also error prone because operator intervention is required to insert the check twice to scan both sides. The same side of the check could thus be easily accidentally scanned twice, scanning the second side could be forgotten, a different check could be inserted for the second scan, and other mistakes can be easily made. In addition to not acquiring both of the check images (i.e., front and back side images) that are required for electronic check processing by the clearinghouse, another problem with the foregoing method is that wrong image data could be generated.

A media processing apparatus according to the present invention eliminates such tedious operation and thus reduces the likelihood of operating errors by making it possible to image both sides of a check, as well as read magnetic ink characters printed thereon, with the operator inserting each check only once for processing.

SUMMARY OF THE INVENTION

A media processing apparatus according to a preferred embodiment of the invention has a first transportation path for guiding a print medium; second and third transportation paths which diverge from the first transportation path; a first scanner which is disposed along the first transportation path and images a first side of the print medium; a second scanner which is disposed along the third transportation path and images a second side of the print medium; and a path switching mechanism for guiding the print medium from the first transportation path to the second or third transportation path.

This media processing apparatus can thus be easily used to scan one side or both sides of the print medium. Scanning both sides of the print medium also requires inserting the print medium only once to the media processing apparatus, thus preventing errors resulting from improperly inserting the print medium.

This media processing apparatus preferably also has an insertion opening, which is formed at one end of the first transportation path, specifically at the opposite end as the divergence point between the first transportation path and the second and third transportation paths, for inserting the print medium; a first discharge opening formed at one end of the second transportation path for discharging the print medium; and a second discharge opening formed at one end of the third transportation path for discharging the print medium.

Whether the print medium was scanned by the second scanner can thus be easily determined based on whether the exit from which the print medium is discharged is the first discharge opening or the second discharge opening. Installation space can thus be reduced and the size of the media processing apparatus can thus be decreased compared with an arrangement in which the second transportation path and third transportation path merge into a single transportation path.

Further preferably, this media processing apparatus also has a pressure feed roller disposed opposite the scanning surface of the second scanner for conveying while pressing the print medium to the scanning surface of the second scanner. The position where the pressure feed roller contacts the print medium is on the second discharge opening side of the second scanner focal point.

The area where the pressure feed roller presses the print medium to the scanning surface of the second scanner can be easily soiled. By offsetting this area from the scanning position of the second scanner, however, a drop in the quality of the scanned image can be suppressed. Furthermore, a drop in scanning quality resulting from outside light entering from the paper exit can be suppressed because the pressure feed roller is located on the exit side of the second scanner scanning position.

A media processing apparatus according to another embodiment of the invention also has a pressure feed roller disposed proximally opposite the second scanner for conveying the print medium; and an urging member for urging the second scanner toward the pressure feed roller. In this arrangement pressure acting on the print medium is produced by the force of the urging member urging the second scanner.

A media processing apparatus according to another embodiment of the invention also has a pressure feed roller disposed proximally opposite the second scanner for conveying the print medium; and a drive mechanism for driving the path switching mechanism and the pressure feed roller;

wherein the drive mechanism causes the path switching mechanism to enable the second transportation path while also driving the pressure feed roller to rotate in a first direction, or causes the path switching mechanism to enable the third transportation path while also driving the pressure feed roller to rotate in a second direction which is opposite the first direction. Note that this second direction is the direction whereby print media in the first transportation path can be conveyed to the side where the second scanner is positioned.

When the pressure feed roller turns in the direction conveying the print medium toward the second scanner, the path switching guide can be moved to the position communicating the third transportation path with the first transportation path. When the second scanner is used for scanning, the print medium can thus be reliably guided to the third transportation path where the second scanner is located.

Further preferably, the path switching mechanism has a path switching member for switching the transportation path that communicates with the first transportation path to either the second transportation path or third transportation path by switching to a first position selecting the second transportation path or a second position selecting the third transportation path; and the pressure feed roller and path switching member are supported on a frame which can pivot relative to the second scanner, and can move to and away from the scanning surface of the second scanner.

This arrangement facilitates maintenance, including cleaning the scanning surface of the second scanner and removing the print medium when a paper jam occurs near the second scanner, for example.

Yet further preferably, the drive mechanism has a roller gear disposed on the roller shaft of the pressure feed roller; a guide gear which meshes with the roller gear and is disposed on a guide shaft which pivotably supports the path switching member; and a transfer gear which transfers drive power from a drive power source to the roller gear and guide gear, and meshes with either the roller gear or guide gear.

Yet further preferably, the media processing apparatus also has an urging member for urging the frame so that the pressure feed roller supported on the frame is urged toward the scanning surface of the scanner.

This arrangement reliably meshes the roller gear or guide gear located on the frame side with the transfer gear located on the second scanner side.

A media processing apparatus according to another embodiment of the invention also has a cover which can open and close to cover the top of the media processing apparatus, and the second scanner is rendered on the cover side.

This arrangement enables using the space inside the cover to install a scanner unit having a second scanner, pressure feed roller, path switching member, and drive mechanism for driving the pressure feed roller and path switching member, and thus also facilitates converting the scanner unit for use in existing devices.

A media processing apparatus according to another embodiment of the invention also has at least one of the following: a first print head which is disposed to the first transportation path and prints a first side of the print medium; a second print head which is disposed to the first transportation path and prints a second side of the print medium; and a magnetic head which is disposed to the first transportation path and reads magnetic ink characters previously printed on the print medium. This media processing apparatus is particularly useful as a hybrid processing apparatus.

A scanner unit according to another embodiment of the invention has a scanner for imaging a print medium; a base which supports the scanner; a pressure feed roller disposed opposite the scanning surface of the scanner; a guide member for guiding the print medium to the scanner; a frame member which supports the pressure feed roller and guide member, and is supported pivotably to the base; and a motor which is supported on the base and drives the pressure feed roller.

This scanner unit further preferably has an urging member for urging the scanner toward the pressure feed roller.

This scanner unit further preferably has an urging member for urging the frame so that the pressure feed roller supported on the frame is urged toward the scanning surface of the scanner.

Further preferably, the guide member is pivotably supported on the frame member.

Yet further preferably, the scanner unit also has a guide shaft for pivotably supporting the guide member; a guide gear disposed on the guide shaft; a roller gear which is disposed on the roller shaft of the pressure feed roller and meshes with the guide gear; and a transfer gear which transfers drive power from the motor to the guide gear and roller gear, and meshes with either the roller gear or guide gear.

Thus rendering a scanner unit enables adding a scanner function to existing media processing apparatuses with minimal design changes.

Other objects and attainments together with a fuller understanding of the invention will become apparent and appreciated by referring to the following description and claims taken in conjunction with the accompanying drawings.

DESCRIPTION OF THE PREFERRED EMBODIMENTS

Figure 1:
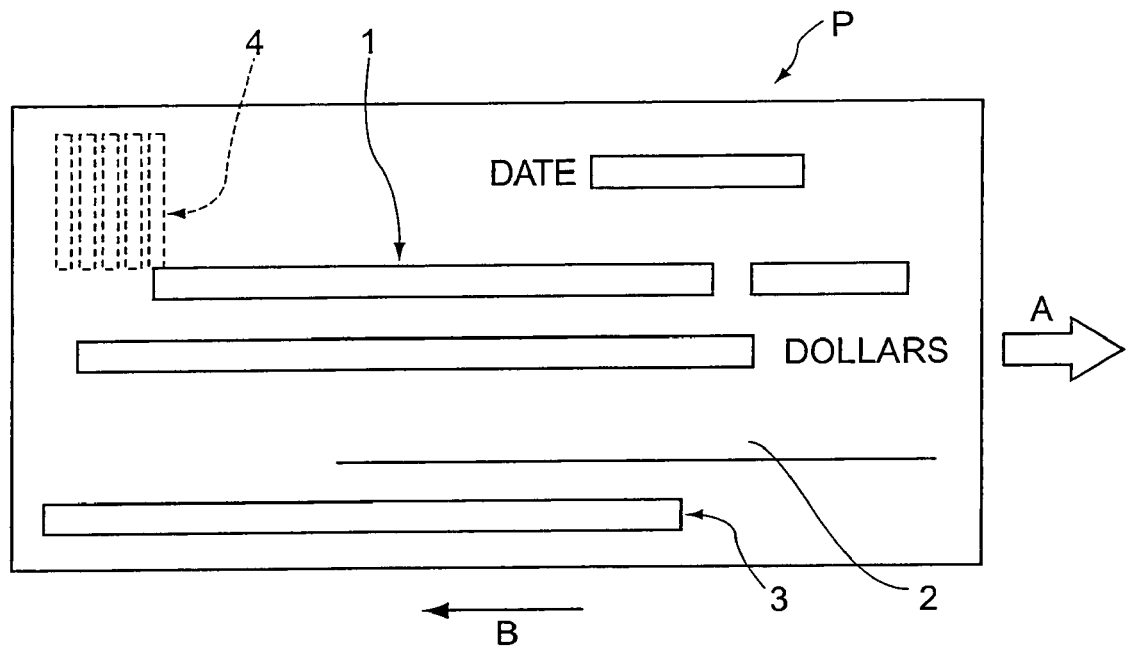
FIG. 1 is a plan view showing the arrangement of a check used by way of example as the print medium processed by a hybrid processing apparatus according to a preferred embodiment of the invention.

A media processing apparatus according to a preferred embodiment of the present invention is described below with reference to the accompanying figures. FIG. 1 is a plan view showing the organization of a typical check that is used by way of example below as the processed print medium. Included on the front of the check P are a payment information area 1 for recording the payee and payment amount, a signature line 2 where the check user signs the check P, and an MICR line 3 where magnetic ink characters are printed. As indicated by the dotted lines, an endorsement area 4 for recording a check endorsement is located on the back of the check P.

The payee, date, and check amount are recorded in the payment information area 1. The payer, that is, the person writing the check P, signs the check P on the signature line 2. An endorsement including the check P verification number, date, check amount, and other information required by the party accepting the check P for payment (referred to below by way of example only as a store) is recorded in the endorsement area 4 on the back of the check P. The bank code, account number, and other information is printed using magnetic ink in the MICR line 3.

Processing a check P payment to complete a retail sale transaction without using a hybrid processing apparatus 10, (see FIG. 2A) which is a type of media processing apparatus, is described below.

First, the payer writes the payee (the name of the store), date, and check amount (in both numbers and words) on the front of the check P, signs at the signature line 2, and hands the check P to the checkout clerk. Alternatively, the payer might hand a blank check to the checkout clerk, the clerk inserts the check to a check printer which prints the payment information on the check P, and the clerk then returns the check P to the customer. The customer then verifies the payment information and signs on the signature line 2, and then returns the check to the clerk.

After the check P is thus written either manually or by a printer, the clerk inserts the check P to a check processing device to read the bank code and account number from the MICR line 3 and send the read information to the bank or check clearinghouse for check P verification. If the check is validated, the store records an endorsement in the endorsement area 4 manually or using the printer, thus accepts the check P for payment and completes processing the check P transaction.

Processing a payment by check P when the hybrid processing apparatus 10 is used is described next.

The check P is first written as described above and then signed in the signature line 2 by the payer. The store clerk then inserts the check P to the hybrid processing apparatus 10, which gets the payment amount and other payment information input from a computer or other control apparatus. The hybrid processing apparatus 10 then reads the bank code, account number, and other information from the MICR line 3, and using this information either the hybrid processing apparatus 10 or control terminal to which the hybrid processing apparatus 10 is connected queries the bank or clearinghouse to determine if the check P is valid. If the check P is valid, the hybrid processing apparatus 10 prints an endorsement on the back, and then scans and images both sides of the check P.

To complete payment, the check P is then presented to the payer's bank. Alternatively, an electronic representation of the check P is transmitted to the bank or clearinghouse instead of presenting the physical check. If the check P is processed electronically, the information printed in magnetic ink characters on the check P, the digital data representing the transaction content, and the images of the check P captured by the scanner are needed. The digital data representing the transaction content includes all of the data recorded on the front and back of the check P except the user's signature. The images of the check P are captured after all information on both the front and the back of the check P, including the signature, has been recorded.

By thus using a hybrid processing apparatus 10 having a printer and scanner in addition to a MICR reader, reading the magnetic ink characters, printing the check front, printing the endorsement, and capturing images of the check P can all be completed in a single continuous operation processing a payment by a check P.

Figure 2A:
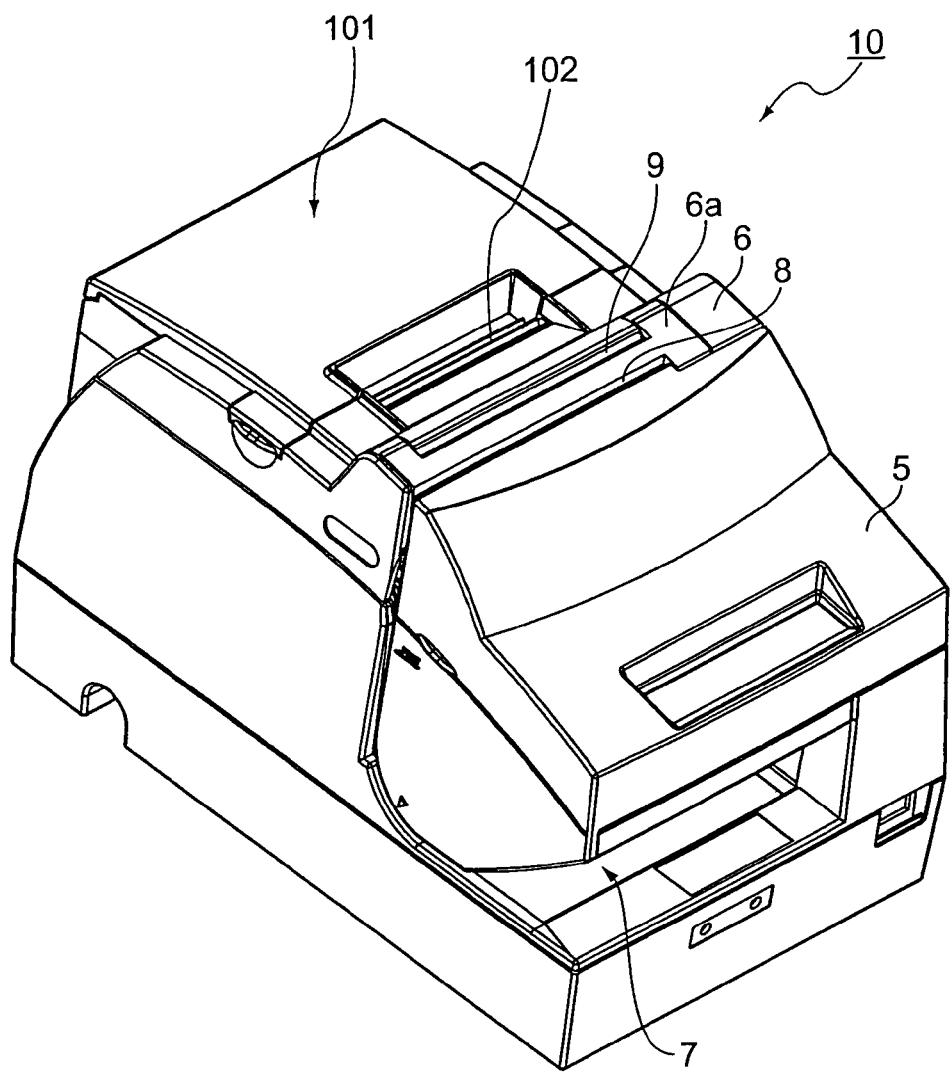
FIG. 2A is an external oblique view of a hybrid processing apparatus according to the present invention.
Figure 2B:
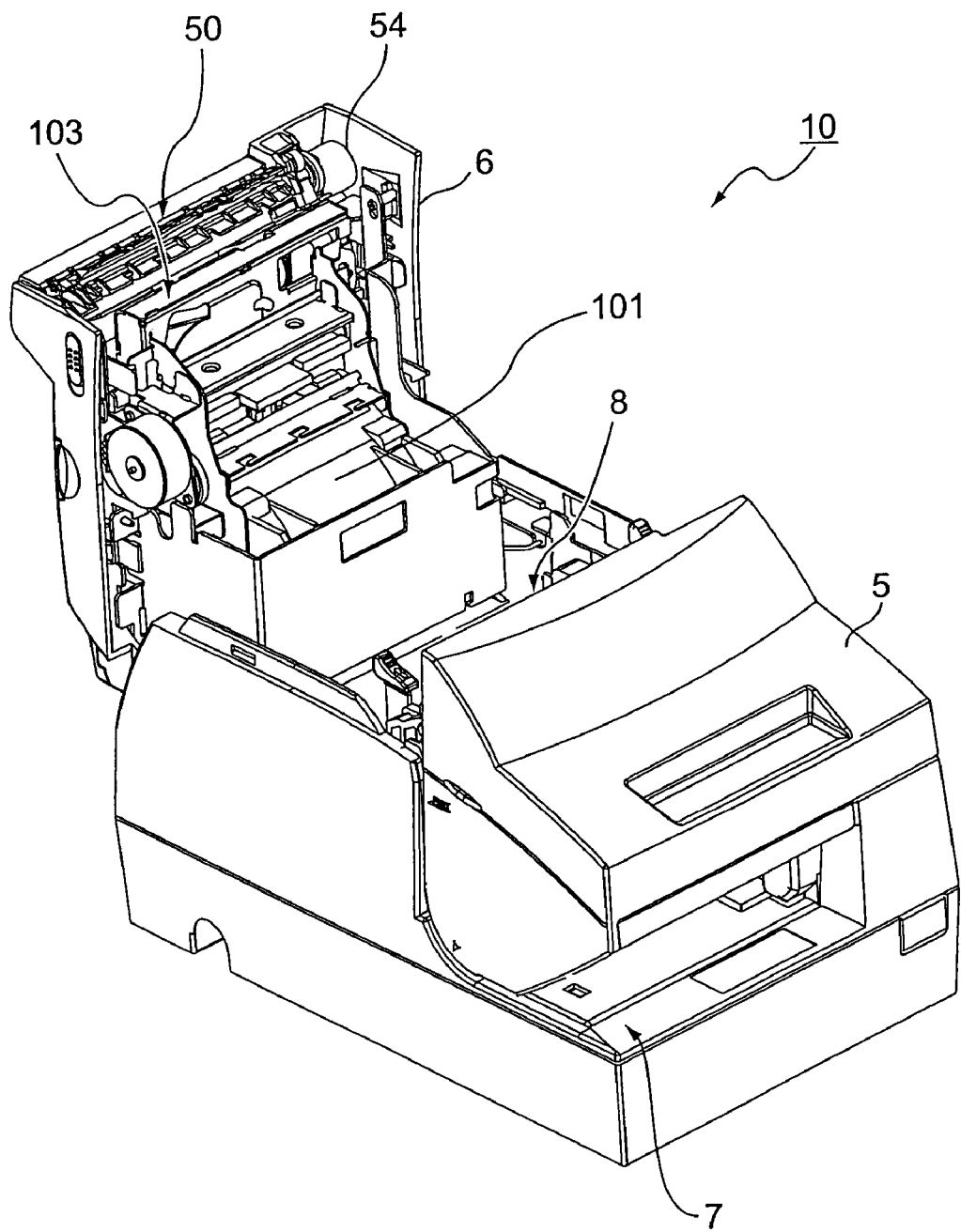
FIG. 2B is an external oblique view showing the hybrid processing apparatus with the cover open.

FIG. 2A is an oblique view showing the appearance of a hybrid processing apparatus according to this embodiment of the invention. FIG. 2B is an external oblique view showing the hybrid processing apparatus of this embodiment of the invention when the cover is open. The front top part of this hybrid processing apparatus 10 is covered by a front case 5 and a cover 6. An insertion opening 7 for manually inserting a check P is formed at the front of the hybrid processing apparatus 10, and first paper exit 8 and second paper exit 9 are formed in the top part of the hybrid processing apparatus 10 for discharging the processed check P. A check inserted from the insertion opening 7 is thus discharged from first paper exit 8 or second paper exit 9. A roller unit cover 6a further described below (see FIG. 6) is located between first paper exit 8 and second paper exit 9.

A roll paper compartment 101 for holding roll paper for printing receipts is also rendered in the back part of the hybrid processing apparatus 10. Roll paper stored in this roll paper compartment 101 is printed as the paper is conveyed through a printing section not shown, and is discharged from a roll paper exit 102 rendered in the top of the hybrid processing apparatus 10 behind the second paper exit 9. An automatic paper cutter 103 located near the roll paper exit 102 inside the hybrid processing apparatus 10 cuts the printed roll paper so that the portion cut off can be issued as a receipt. The magnetic ink characters are read sequentially from right to left in the direction of arrow B in FIG. 1, and the check P is therefore inserted in the direction of arrow A in FIG. 1.

Figure 3:
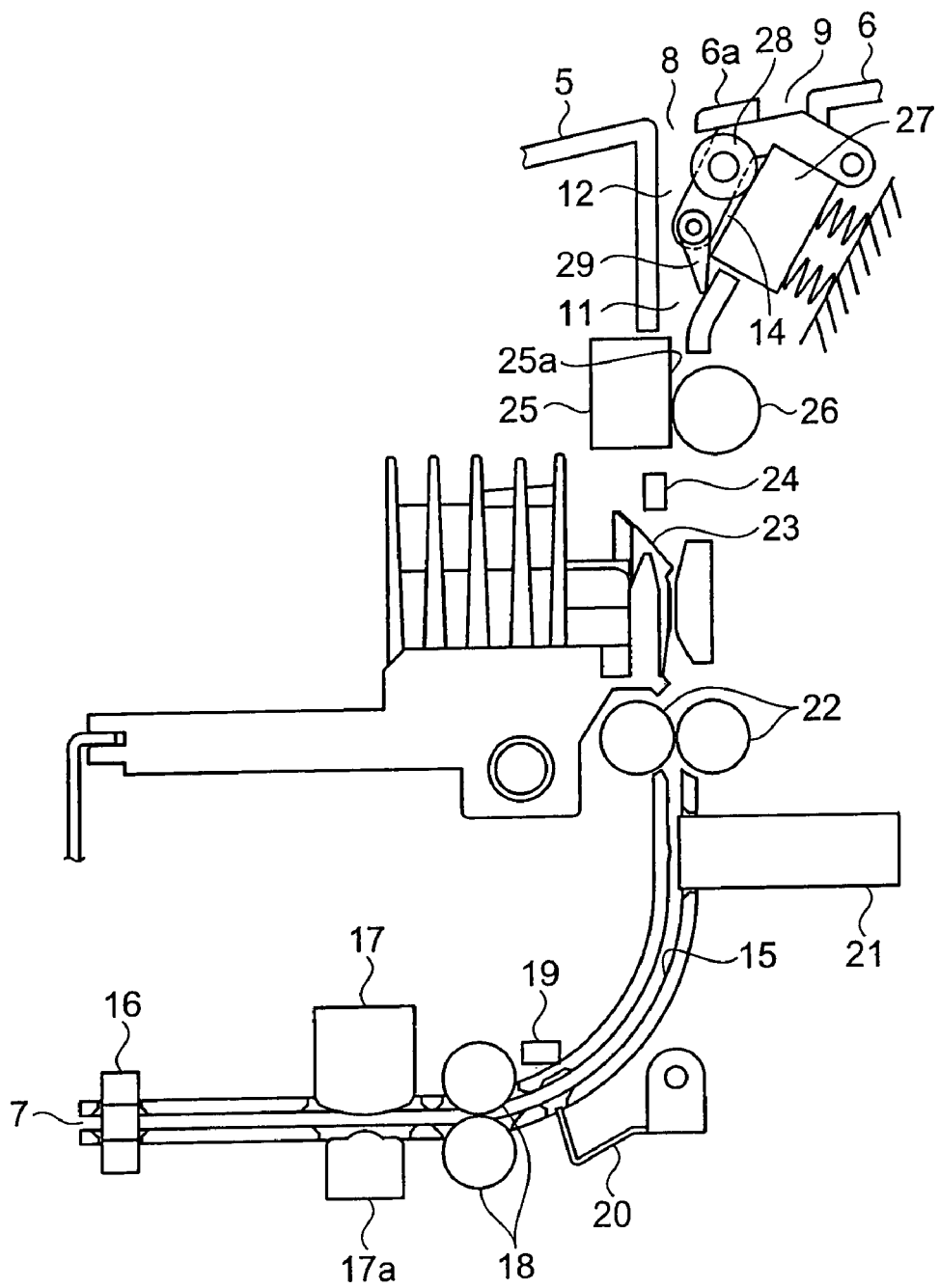
FIG. 3 is a side section view showing the internal arrangement of the hybrid processing apparatus.

FIG. 3 is a side section view showing the internal structure of the hybrid processing apparatus. Rendered inside this hybrid processing apparatus 10 are a first transportation path 15 extending from insertion opening 7 to divergence point 11, second transportation path 12 extending from divergence point 11 to first paper exit 8, and third transportation path 14 extending from divergence point 11 to second paper exit 9.

When seen from the side, first transportation path 15 extends horizontally from insertion opening 7 and then curves substantially in an L-shape and extends vertically to the divergence point 11.

Disposed along the first transportation path 15 in order from insertion opening 7 are a trailing end detector 16 for detecting the trailing end of an inserted form (check), MICR head (magnetic head) 17, first transportation roller pair 18, leading end detector 19 for detecting the leading end of the form, paper positioning member 20, rear print head (second print head) 21, second transportation roller pair 22, front print head (first print head) 23, paper discharge detector 24, front scanner (first scanner) 25, and a front scanner transportation roller 26 disposed opposite the front scanner 25.

Disposed along the third transportation path 14 are a back scanner (second scanner) 27 and a back scanner transportation roller (pressure feed roller) 28 opposite the back scanner 27. A path switching guide 29 for selectively communicating the second transportation path 12 or third transportation path 14 with the first transportation path 15 is pivotably supported at the divergence point 11 so that the path switching guide 29 can swing freely.

The trailing end detector 16, leading end detector 19, and paper discharge detector 24 are transmitting or reflecting type photodetectors, for example, for contactlessly detecting the presence of a check P at the respective positions along the first transportation path 15.

The paper positioning member 20 causes a check P inserted from the insertion opening 7 to pause at a specific position, and can be set by a solenoid or other type of actuator to a position interceding in the first transportation path 15 or a position retracted from the first transportation path 15.

The first transportation roller pair 18 and second transportation roller pair 22 are each composed of a pair of roller members disposed on opposite sides of the first transportation path 15, and convey a check P in either the forward or reverse direction by driving either one of the rollers. A solenoid or other actuator can also move one roller in each roller pair freely to and away from the opposing roller, thereby opening or closing the first transportation path 15.

The MICR head 17 reads magnetic ink characters printed on the front of the check P. Whether the check P is valid or invalid is determined using the information recorded in the magnetic ink characters that are read from the magnetic data scanned by the MICR head 17. These magnetic ink characters are printed in the MICR line 3 on the face of the check P, and the recorded data includes the account number of the check P as described above. A pressure member 17a for pressing the check P against the MICR head 17 for reading is disposed opposite the MICR head 17. This pressure member 17a is pressed against the MICR head 17 during the reading operation, but is normally retracted from the pressure member 17a so that the first transportation path 15 is open. The pressure member 17a can thus move to and away from the MICR head 17, and is operated by a solenoid or other actuator to open and close the first transportation path 15.

The front print head 23 is the print head used to print the payee, check date, and amount in the payment information area 1 on the front of the check P as described above. The front print head 23 in this embodiment of the invention is a dot matrix serial print head supported on a carriage and prints one or multiple lines at a time while traveling widthwise to the check P.

The rear print head 21 is the print head used to print the endorsement, which typically includes the check verification number, date, check amount, and other information required by the store (payee) in the endorsement area 4 on the back of the check P. The rear print head 21 is a shuttle head having a plurality of dot matrix heads with a specific gap therebetween widthwise to the check P, and prints one or multiple lines at a time as the heads move within the width of this gap.

In this embodiment of the invention, the front and back print heads 23, 21 are dot impact print heads that transfer ink from an ink ribbon not shown to the check P, but inkjet print heads or other type of print head could be used instead.

The front scanner 25 scans the front side of the printed check P and captures the image data. The captured image data is then compressed, sent to the host computer 70 (see FIG. 10) to which the hybrid processing apparatus 10 is connected and stored, and is used for electronic transaction processing. The front scanner 25 is a contact image sensor (CIS) scanner in this embodiment of the invention, and scans with the check P pressed against the scanning surface 25a. The front scanner transportation rollers 26 convey the check P during the scanning operation. More particularly, during the scanning operation, the front scanner transportation rollers 26 press the check P against the scanning surface 25a of the front scanner 25 while conveying the check P toward the divergence point 11.

As shown in FIG. 2B, cover 6 can open and close by pivoting at a point at the back of the hybrid processing apparatus 10. The operator can thus easily open the cover 6 to access the rear print head 21, front scanner 25, and other internal components for maintenance.

Figure 4:
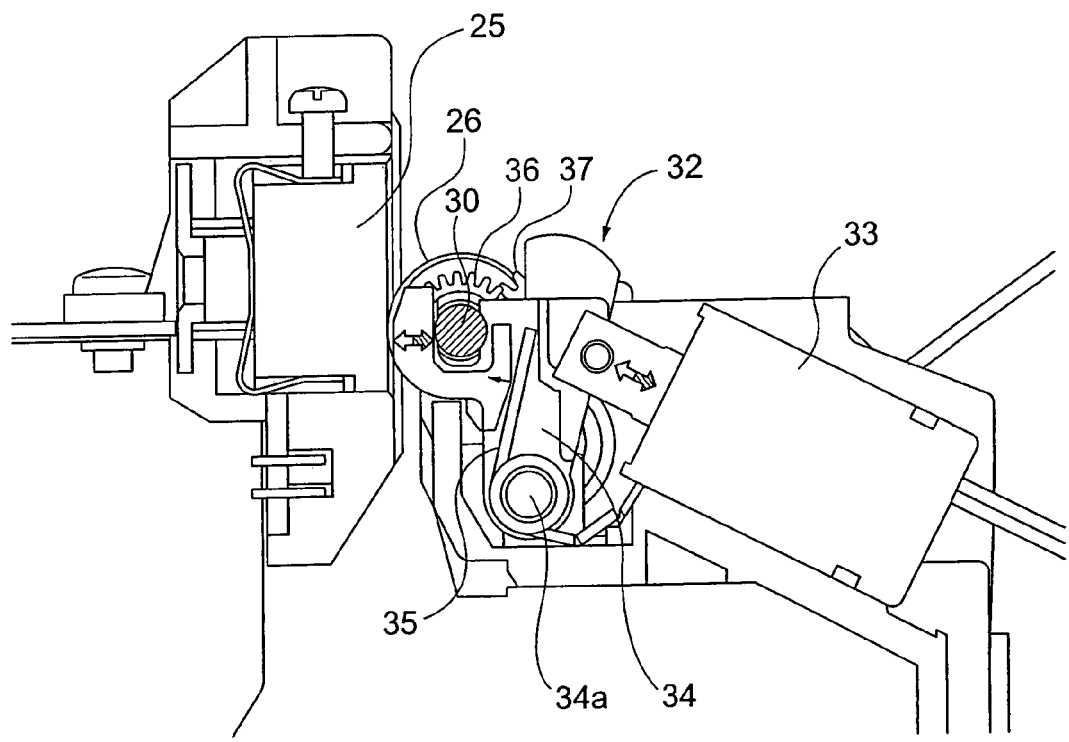
FIG. 4 is a side view showing the roller retraction mechanism.
Figure 5:
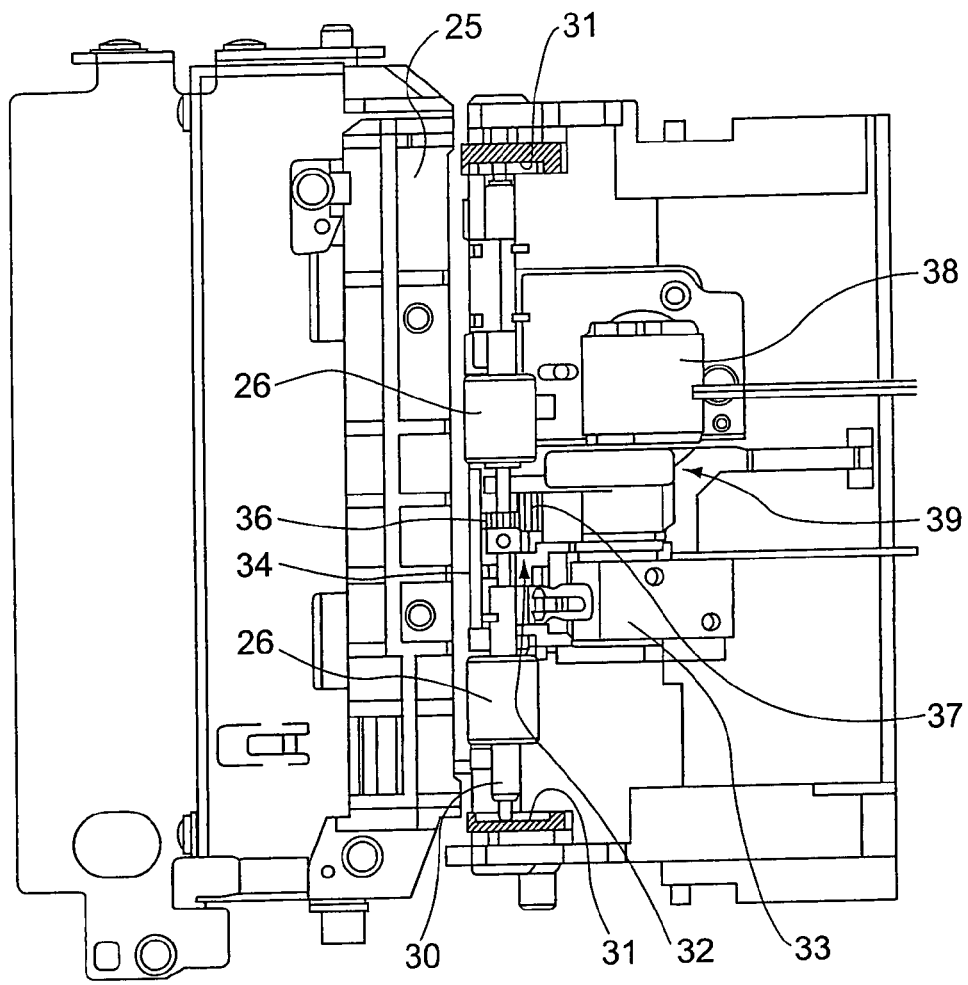
FIG. 5 is a plan view showing the roller retraction mechanism.

The front scanner transportation roller 26 retraction mechanism is described next. FIG. 4 is a side view of the roller retraction mechanism, and FIG. 5 is a plan view of the same roller retraction mechanism.

As shown in the figures, a pair of front scanner transportation rollers 26 is disposed on a roller shaft 30 with a specific gap therebetween. The ends of the roller shaft 30 are guided by and moved forward and back freely along a guide channel 31 with the center of the roller shaft 30 supported by a roller retraction mechanism 32. The roller retraction mechanism 32 pulls the roller shaft 30 away from the front scanner 25 when a scanner transportation roller solenoid 33 is energized, thus causing the front scanner transportation rollers 26 to retract from the front scanner 25 and opening the first transportation path 15. The front scanner transportation rollers 26 are thus in the retracted position when a check is not being scanned, thereby preventing the check P from being nipped by the front scanner transportation rollers 26. During the scanning operation, the first transportation roller pair 18 and second transportation roller pair 22 advance the check P to the scanning start position, retraction of the front scanner transportation rollers 26 is released so that the check P is pressed to the front scanner 25, and the front scanner transportation rollers 26 are then driven to convey the check P.

As shown in FIG. 4, the roller retraction mechanism 32 comprises a pressure lever 34 that freely rotatably supports the roller shaft 30 and causes the roller shaft 30 to move to and away from the front scanner 25, a pressure spring 35 that urges the pressure lever 34 toward the front scanner 25, and a scanner transportation roller solenoid 33 that retracts the pressure lever 34 in resistance to the urging force of the pressure spring 35. The pressure lever 34 is a rotatable member that can rotate freely forward and back on a pivot shaft 34a. This rotatable member supports the roller shaft 30 of the front scanner transportation rollers 26 so that the roller shaft 30 can be freely advanced and retracted, thus making it possible to compactly configure the roller retraction mechanism 32 and afford a smooth retracting and advancing operation. This pressure lever 34 also supports the roller shaft 30 between the pair of front scanner transportation rollers 26.

The pair of front scanner transportation rollers 26 can thus be urged substantially evenly by a single pressure spring 35, the pair of front scanner transportation rollers 26 can be held substantially parallel when advancing and retracting, and the first transportation path 15 can be reliably opened.

The roller retraction mechanism 32 also has a drive system for driving the front scanner transportation rollers 26. This front scanner transportation roller 26 drive system includes a first gear 36 disposed in unison with the roller shaft 30 between the pair of front scanner transportation rollers 26, a second gear 37 rendered to the pressure lever 34 and constantly engaged with the first gear 36, and a transmission mechanism 39 for transferring drive power from the front scanner feed motor 38 to the second gear 37. This renders a path for transferring roller drive power to the support part of the roller shaft 30, and reliably transfers power to the front scanner transportation rollers 26. In addition, causing the position to which pressure is applied by the pressure spring 35 to the roller shaft 30 to be proximal to the position where power is transferred to the roller shaft 30 enables the rotation of the front scanner transportation rollers 26 without disrupting the balance of pressure between the rollers.

Figure 6A:
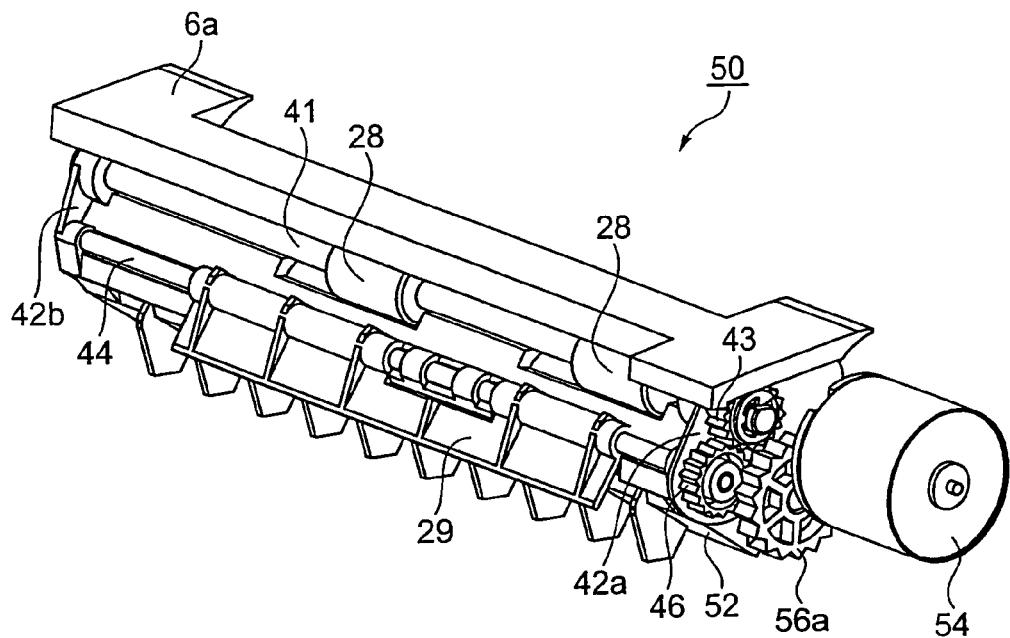
FIG. 6A is an oblique view of the back scanner unit.
Figure 6B:
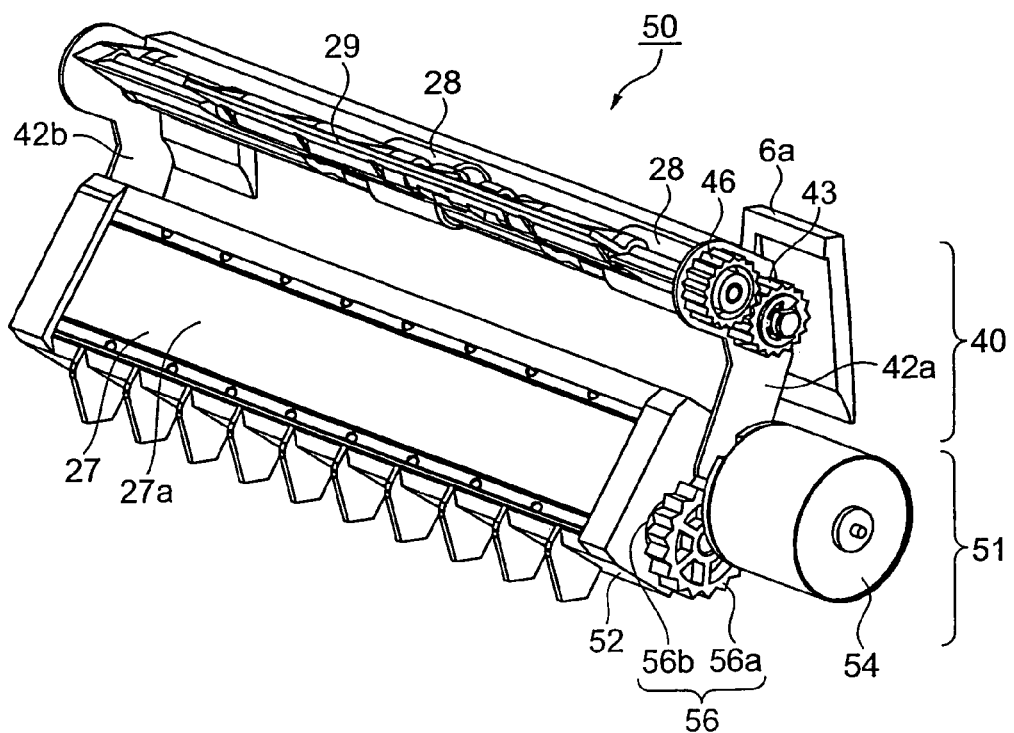
FIG. 6B is an oblique view of the back scanner unit with the transportation roller unit separated from the scanning surface.
Figure 7:
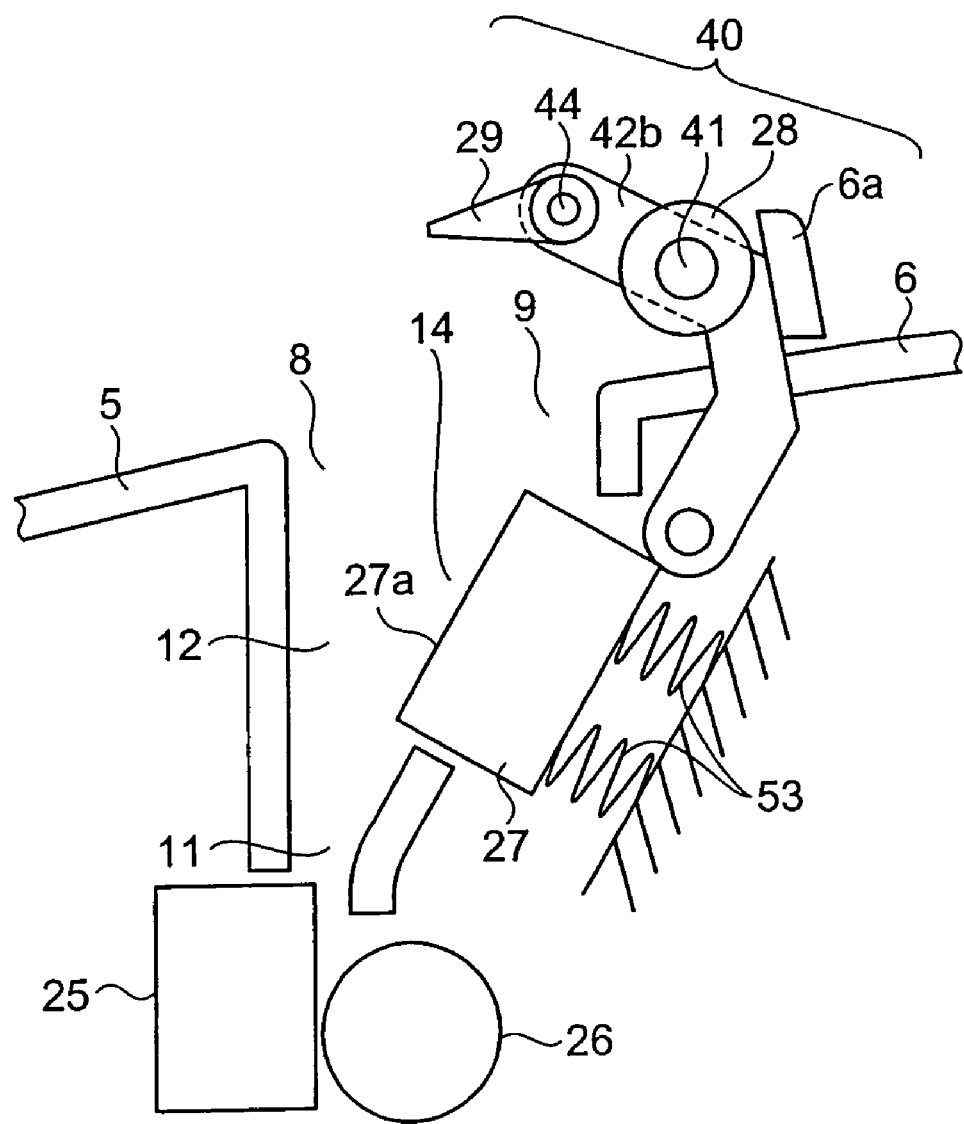
FIG. 7 is a schematic section view showing the transportation roller unit separated from the back scanner unit.

The arrangement of the back scanner unit 50 is described next. FIG. 6A and FIG. 6B are oblique views of the back scanner unit 50, and FIG. 7 is a schematic section view of the back scanner unit 50.

The back scanner unit 50 comprises a feed roller unit 40 including back scanner transportation roller 28 and path switching guide 29, and a main scanner unit 51 including back scanner 27. As shown in FIG. 2B, the back scanner unit 50 is rendered in the cover 6.

The back scanner 27 scans the back of the printed check P and captures the image data. The acquired image data is compressed and stored to the host computer 70 which uses the image data for electronic transaction processing. A contact image sensor is used for the back scanner 27, which scans the check with the check P in contact with the back scanning surface 27a.

As shown in FIG. 6A and FIG. 6B, the feed roller unit 40 comprises a back scanner transportation roller 28 opposite the back scanning surface 27a, back roller shaft 41, first and second unit frames 42a and 42b, roller gear 43, path switching guide 29, guide shaft 44, guide gear 46, and roller unit cover 6a.

The back scanner transportation roller 28 is coaxially affixed to back roller shaft 41. The ends of the back roller shaft 41 are axially supported freely rotationally by the first and second unit frames 42a and 42b and are prevented from slipping in the axial direction. The end of the back roller shaft 41 on the first unit frame 42a side passes through the first unit frame 42a, and the roller gear 43 is affixed to the protruding part (the end opposite the end to which the back scanner transportation roller 28 is affixed).

The path switching guide 29 is axially supported by and rotates in conjunction with the guide shaft 44. The ends of the guide shaft 44 are axially supported by the first and second unit frames 42a and 42b so that the guide shaft 44 can rotate freely and does not slip in the axial direction. The end of the guide shaft 44 on the first unit frame 42a side passes through the first unit frame 42a, and guide gear 46 is affixed to the protruding part (the end opposite the end to which the path switching guide 29 is attached). Roller gear 43 meshes with guide gear 46 so that rotation of one gear is transferred to the other. The ends of roller unit cover 6a are fixed to first unit frame 42a and second unit frame 42b. Note that first and second unit frames 42a and 42b are a substantially C-shaped integrally molded frame member.

The main scanner unit 51 includes back scanner 27, scanner unit base 52, back scanner spring 53 (see FIG. 7), back scanner feed motor 54, and transmission gear 56.

The back scanner 27 is affixed to the scanner unit base 52 so that the back scanner 27 can slide freely in the direction perpendicular to the surface of back scanning surface 27a, and is urged toward the back scanner transportation roller 28 by back scanner springs 53 (urging member). The back scanner feed motor 54 is fixed to the scanner unit base 52, and an output gear (not shown in the figure) is affixed to the output shaft of the back scanner feed motor 54. A two-stage transmission gear 56 is freely rotationally axially supported on the scanner unit base 52, and the large gear 56a meshes with the output gear.

One end of each of the first and second unit frames 42a and 42b is axially supported to rock freely to the scanner unit base 52 so that the feed roller unit 40 can move to and away from the back scanner 27. When scanning with the back scanner 27, the feed roller unit 40 is close to the back scanner 27 as shown in FIG. 6A so as to be in a closed position, and small gear 56b of transmission gear 56 is meshed with guide gear 46. Rotation of the back scanner feed motor 54 output shaft is thus transferred through the output gear, transmission gear 56, and guide gear 46 to the roller gear 43, and back scanner transportation roller 28 fixed to back roller shaft 41 coaxially to the roller gear 43 can thus be turned.

The feed roller unit 40 can be changed between a closed position relative to the main scanner unit 51 as shown in FIG. 6A and an open position as shown in FIG. 6B. When in the closed position, feed roller unit 40 is positioned between first paper exit 8 and second paper exit 9 and forms second transportation path 12 and third transportation path 14 as shown in FIG. 3. When in the open position, the second transportation path 12 and third transportation path 14 are open as shown in FIG. 7. The operator can thus open the feed roller unit 40 to remove paper jams and checks P stuck in the second transportation path 12 or third transportation path 14, clean the back scanning surface 27a of back scanner 27, and other maintenance.

In order to hold the feed roller unit 40 positioned appropriately to the back scanner 27 when in the closed position, urging member such as a coil spring, plate spring, or other elastic member is disposed to either or both of the first and second unit frames 42a and 42b to press the feed roller unit 40 to the back scanning surface 27a of back scanner 27. This causes the guide gear 46 on the first unit frame 42a side to mesh reliably with the small gear 56b of transmission gear 56 on the scanner unit base 52 side. In this preferred embodiment of the invention a torsion spring is disposed to both first and second unit frames 42a and 42b with one end of the spring attached to first and second unit frames 42a and 42b and the other end attached to the scanner unit base 52. Alternatively, two stable points could be rendered on either or both first and second unit frames 42a and 42b to stably support the feed roller unit 40 in the closed position and open position.

By thus rendering the back scanner unit 50 as a modular unit, the back scanner unit 50 can be easily removed and installed, and can also be easily adapted for use in other products.

Figure 8:
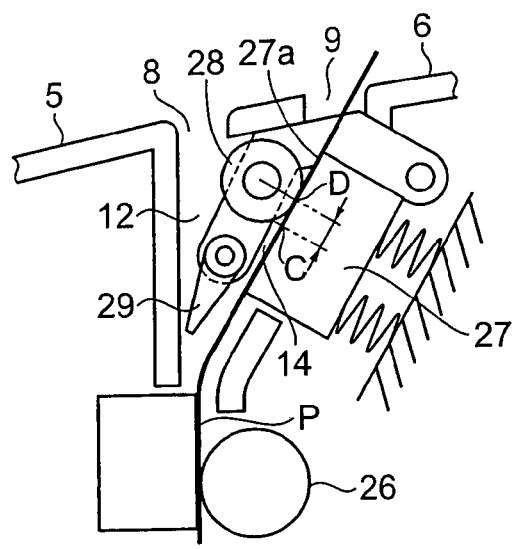
FIG. 8 is a schematic section diagram showing the area around the back scanner transportation roller and back scanner.

FIG. 8 is a schematic section view of the area around the back scanner transportation roller and back scanner. The back scanner transportation roller 28 conveys the check P during the scanning operation, and the force urging the back scanner 27 toward the back scanner transportation roller 28 presses the check P to the back scanning surface 27a of the back scanner 27 while the back scanner transportation roller 28 conveys the check P from divergence point 11 toward the second paper exit 9. The back scanner transportation roller 28 thus presses the check P to the back scanning surface 27a not at the focal point C of the back scanner 27 but at a position offset slight from this focal point C. The focal point C of the scanner is thus offset either upstream or downstream in the transportation direction from the scanner contact point D of the back scanner transportation roller 28. In this embodiment of the invention, the point D where the back scanner transportation roller 28 contacts the back scanner 27 is more particularly offset 0.8 mm to the downstream side in the transportation direction (that is, toward second paper exit 9) from the scanner focal point C.

This prevents the back scanner transportation roller 28 from applying pressure directly at the focal point C of the scanner. This reduces the transfer of ink to the scanner focal point C when scanning a check P immediately after printing by the rear print head 21, and thus minimizes or prevents a loss of scanning quality due to ink on the scanning surface. Furthermore, because the scanner contact point D of the back scanner transportation roller 28 is offset downstream in the transportation direction from the focal point C of the back scanner 27, outside light entering from the second paper exit 9 is prevented from passing the gap between the check P and back scanning surface 27a and being directly incident to the scanner focal point C.

If the scanner focal point C is offset greatly from the scanner contact point D of the back scanner transportation roller 28, the check P could lift away from the back scanning surface 27a at the scanner focal point C. An offset of only approximately 0.8 mm, however, keeps the check P from lifting more than 0.2 mm from the back scanning surface 27a at the focal point C, thus greatly reducing the likelihood of a drop in scanning quality.

The back scanner transportation roller 28 conveys the check P upward passed the back scanner 27 for scanning, and then discharges the check P from second paper exit 9. The trailing end of the check P is held by the third transportation path 14 on the downstream side of the back scanner transportation roller 28. The length of the end portion of the third transportation path 14 (that is, the portion between the back scanner transportation roller 28 and second paper exit 9) is approximately L/6 (where L is the length of the check P). The third transportation path 14 can thus reliably hold the trailing end of the discharged check P and the discharged check P thus does not fall out from the hybrid processing apparatus 10.

Figure 9A:
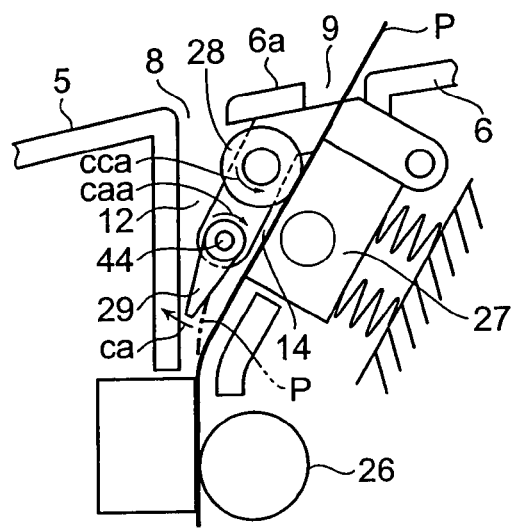
FIG. 9A is a schematic section diagram showing the third transportation path communicating with the first transportation path.
Figure 9B:
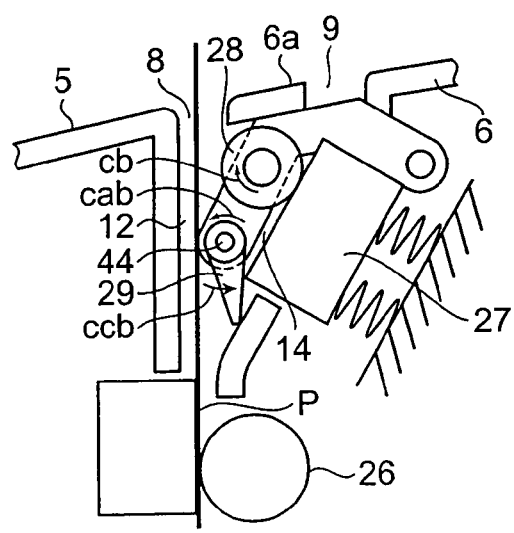
FIG. 9B is a schematic section diagram showing the second transportation path communicating with the first transportation path.

The operation switching between the second transportation path 12 and third transportation path 14 is described next. FIG. 9A is a schematic section diagram showing the third transportation path 14 communicating with the first transportation path, and FIG. 9B shows the second transportation path 12 communicating with the first transportation path.

When the back scanner 27 is used for scanning, the back scanner transportation roller 28 is rotationally driven in the direction of arrow cca shown in FIG. 9A and thus conveys the check P toward the second paper exit 9. The guide gear 46 transferring power to the back scanner transportation roller 28 is turning in the direction of arrow caa, and the guide shaft 44 to which guide gear 46 is affixed thus also turns in the direction of arrow caa. Because the path switching guide 29 is axially supported by and rotates in conjunction with guide shaft 44 as described above, the first transportation path 15 end of the path switching guide 29 swings in the direction of arrow ca, thus closing the second transportation path 12 and opening the third transportation path 14. The path switching guide 29 can be configured to stop when it pivots in the direction of arrow ca and contacts the front case 5 in front of it, for example.

Note that the constraining force between the path switching guide 29 and guide shaft 44 is sufficient to cause the path switching guide 29 to swing in conjunction with guide shaft 44 and yet not create a heavy load when the guide shaft 44 continues turning after the path switching guide 29 stops. A clutch mechanism could also be provided so that force is transferred intermittently to the path switching guide 29 and the guide shaft 44 can continue turning after the path switching guide 29 has stopped. A friction clutch, for example, can be rendered by disposing a coil compression spring between the guide gear 46 and the path switching guide 29 of guide shaft 44.

When the path switching guide 29 is thus positioned as described above and shown in FIG. 9A, the leading end of a check P traveling through the first transportation path toward the exit contacts the path switching guide 29 as indicated by the double-dot dash line shown in FIG. 9A and is thus guided into the third transportation path 14. The check P guided into the third transportation path 14 is then conveyed by back scanner transportation roller 28, the back of the check P is scanned by the back scanner 27, and the check P is discharged from the second paper exit 9.

If the check P is conveyed to the first paper exit 8 such as when the back of the check P is not scanned, the back scanner feed motor 54 is driven so that the back scanner transportation roller 28 rotates in the direction of arrow cb shown in FIG. 9B. The guide shaft 44 thus turns in the direction of arrow cab, and the path switching guide 29 swings in the direction of arrow ccb and is positioned so that the third transportation path 14 is closed and the second transportation path 12 is open. The path switching guide 29 can be configured to stop when it pivots in the direction of arrow ccb and contacts the bottom part of the scanner unit base 52, for example.

The back scanner feed motor 54 is stopped when the path switching guide 29 stops swinging. The path switching guide 29 remains held by the guide shaft 44 by the constraining force causing the path switching guide 29 to move in conjunction with the guide shaft 44, and thus remains in the position closing communication between the first transportation path and the third transportation path 14 when the back scanner feed motor 54 stops. A check P conveyed through the first transportation path toward the exit thus advances straight into the second transportation path 12 and is discharged from the first paper exit 8.

A detector such as an optical sensor or a mechanical switch with a lever for sensing discharge of the check P could be rendered near the first paper exit 8 and second paper exit 9 to detect the position of the check P. This enables discharging checks to a position enabling easy handling by the operator, such as to a position where the check P is held enough to prevent the check P from falling out from the exit or to a position where the check P is completed discharged.

Figure 10:
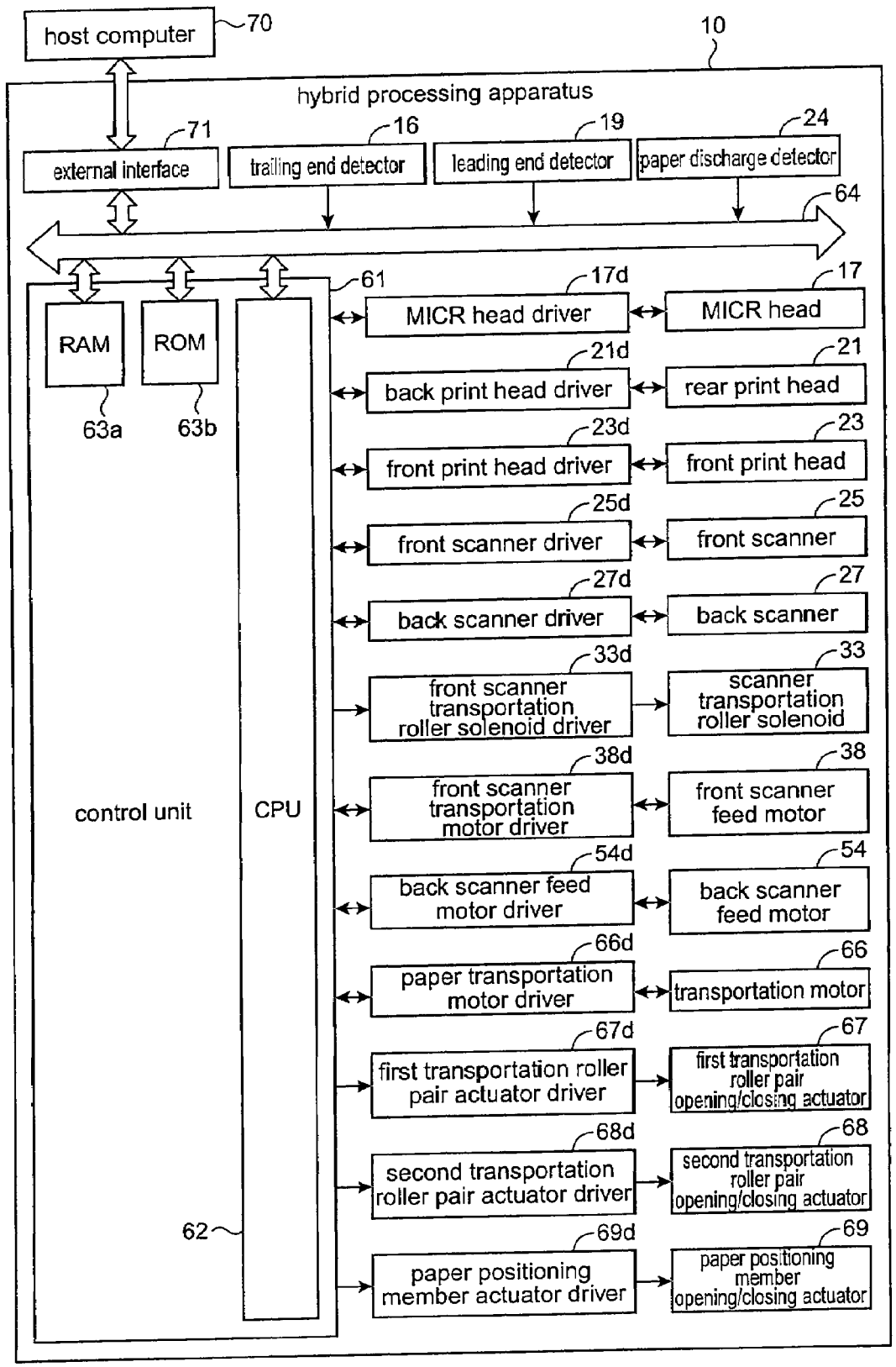
FIG. 10 is an electrical block diagram of the hybrid processing apparatus.

The electrical arrangement of the hybrid processing apparatus 10 is described next. FIG. 10 is an electrical block diagram of the hybrid processing apparatus 10.

Referring to FIG. 10, control unit 61 provides central control and management of the other parts of the hybrid processing apparatus 10. The control unit 61 has a CPU 62 for executing operations, RAM 63a for temporarily storing control commands and print data received from the host computer 70, and ROM 63b for storing the routines and programs for executing the operating processes. These components communicate over a common bus 64. Note that ROM 63b is preferably flash ROM or other erasable, writable memory device enabling non-volatile data storage.

Detectors including the trailing end detector 16, leading end detector 19, and paper discharge detector 24 are connected over bus 64 to control unit 61. The above-described MICR head 17, rear print head 21, front print head 23, front scanner 25, scanner transportation roller solenoid 33, front scanner feed motor 38, back scanner 27, and back scanner feed motor 54 are each connected through a driver including the appropriate controller to the control unit 61. Transportation motor 66, for driving first transportation roller pair 18 and second transportation roller pair 22, first transportation roller pair opening/closing actuator 67 for opening and closing the first transportation roller pair 18, second transportation roller pair opening/closing actuator 68 for opening and closing the second transportation roller pair 22, and paper positioning member opening/closing actuator 69 for opening and closing the paper positioning member 20 are also connected through a driver including the appropriate controller to the control unit 61. The CPU 62 controls the operation of these other parts based on a control program stored in ROM 63b. The hybrid processing apparatus 10 thus executes the operations required for different processes under the control of the host computer 70 connected to the hybrid processing apparatus 10 through an external interface 71.

The processes whereby magnetic ink characters are read from the check P and check P validity is verified, the front and back of the check P are printed, and the front and back of the check P are scanned using this hybrid processing apparatus 10 are described next.

Figure 11:
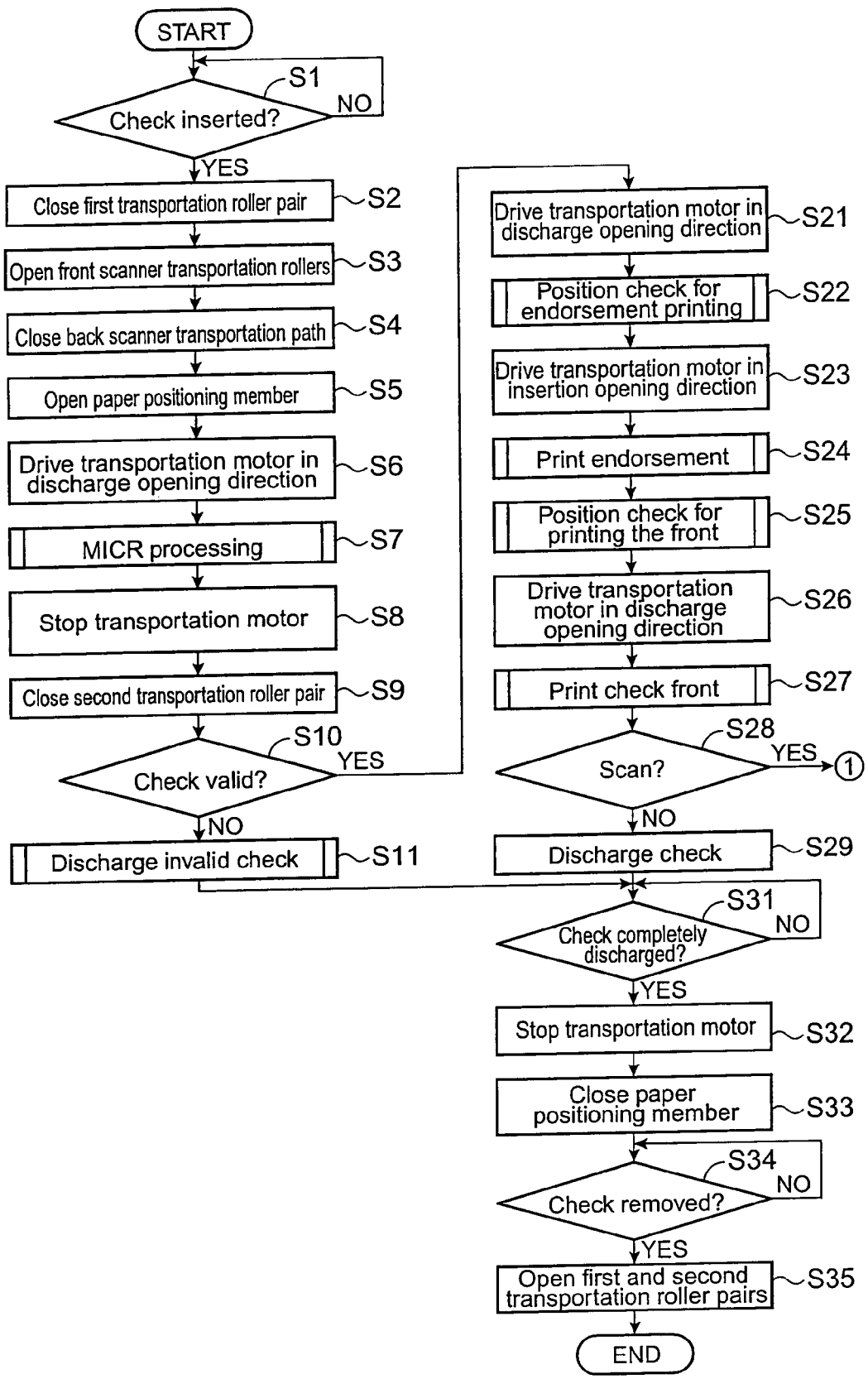
FIG. 11 is a flow chart of the process run by the hybrid processing apparatus.
Figure 12:
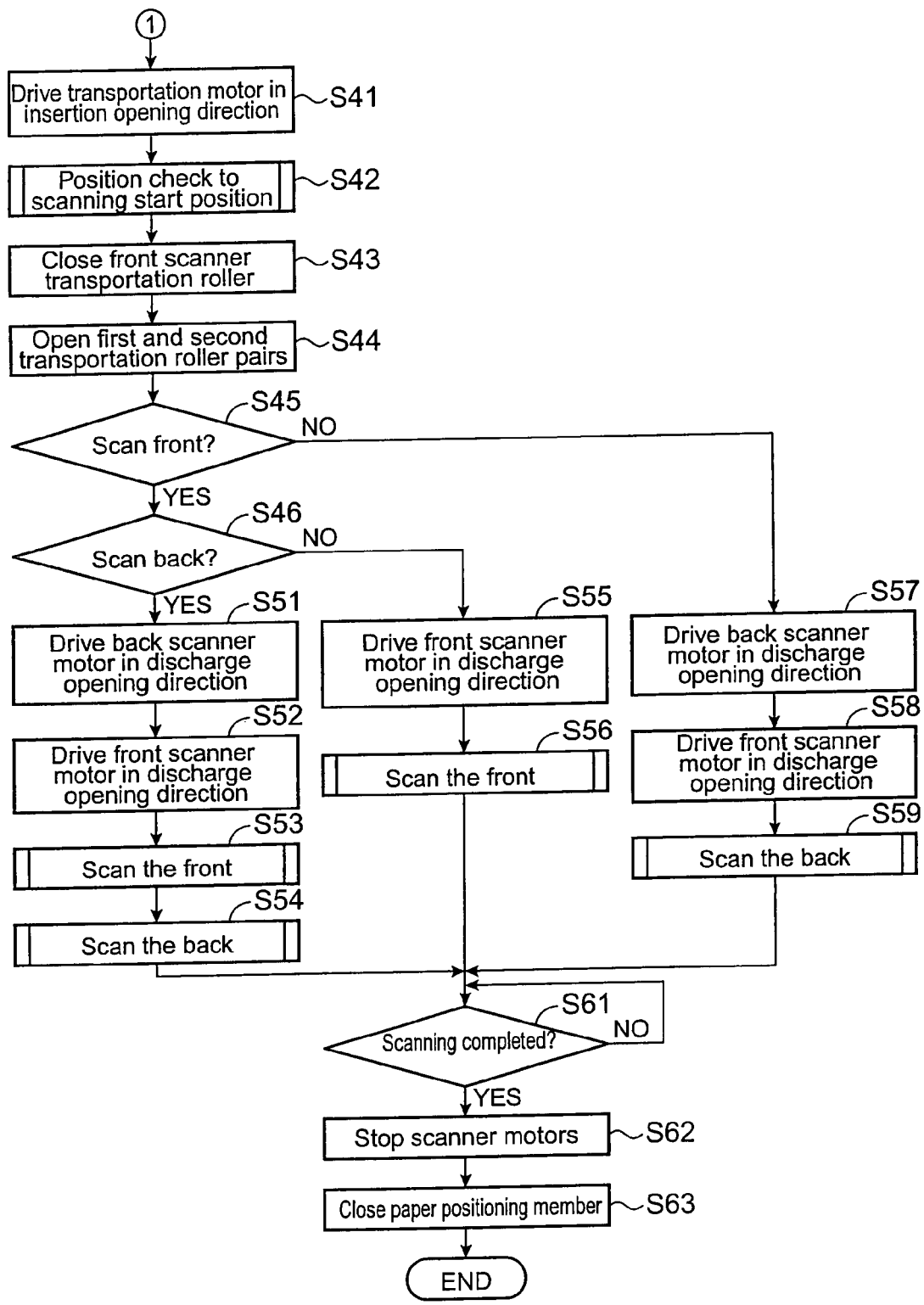
FIG. 12 is a flow chart of the process run by the hybrid processing apparatus.
Figure 13:
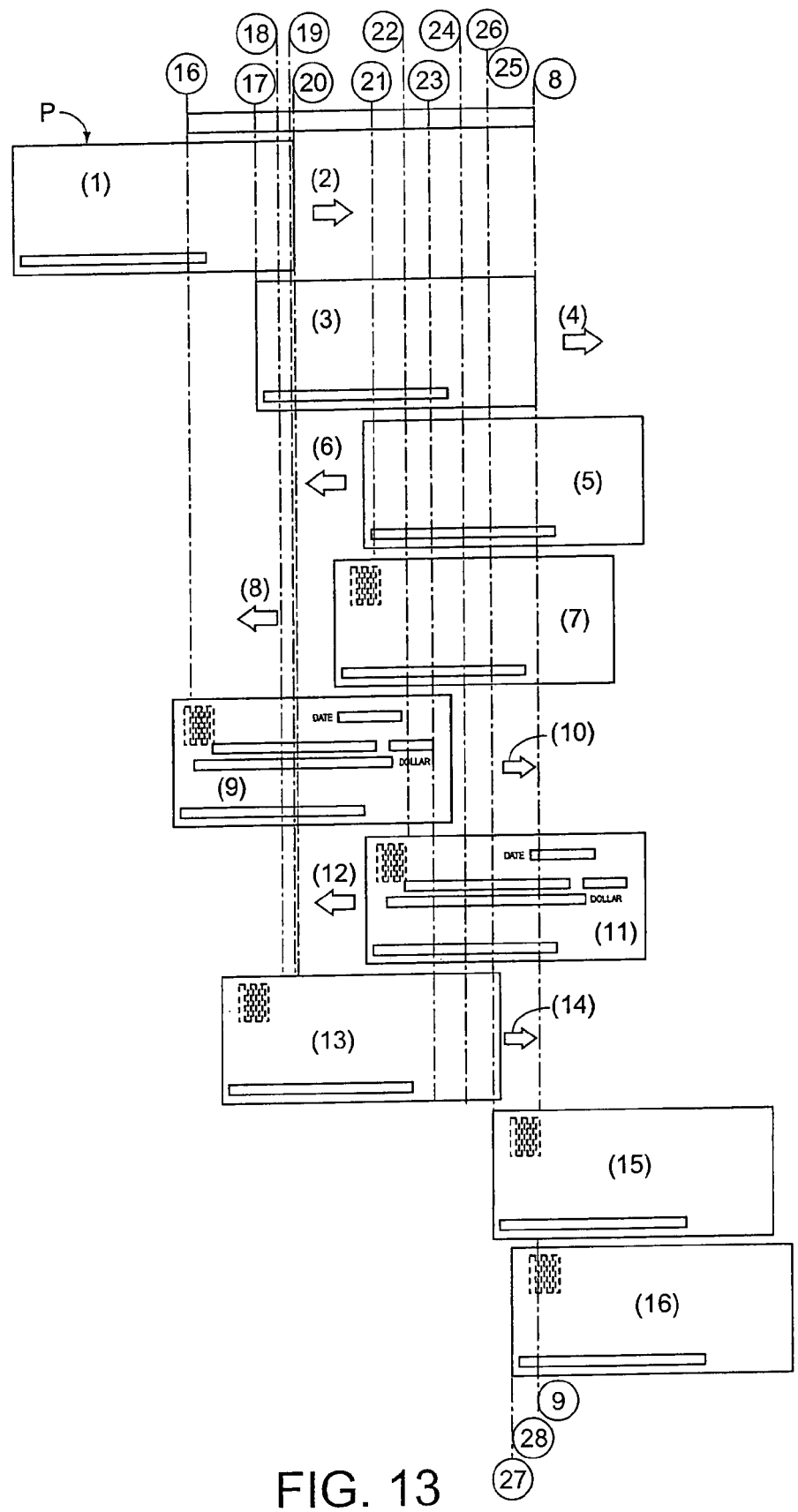
FIG. 13 shows the direction of travel and the positioning of the check during processing.
Figure 14:
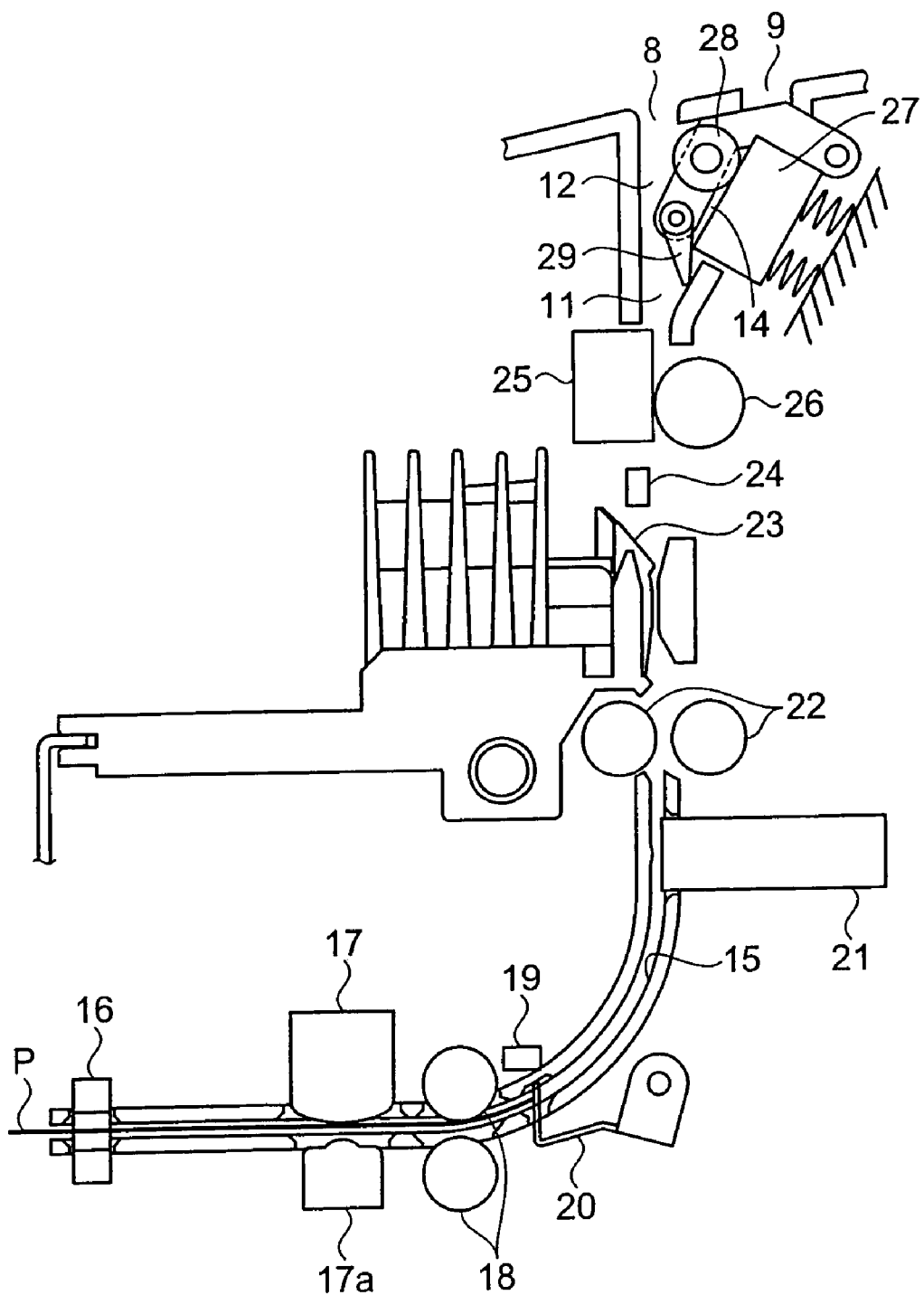
FIG. 14 is a schematic section diagram showing the internal arrangement of the hybrid processing apparatus when a check is inserted.
Figure 15:
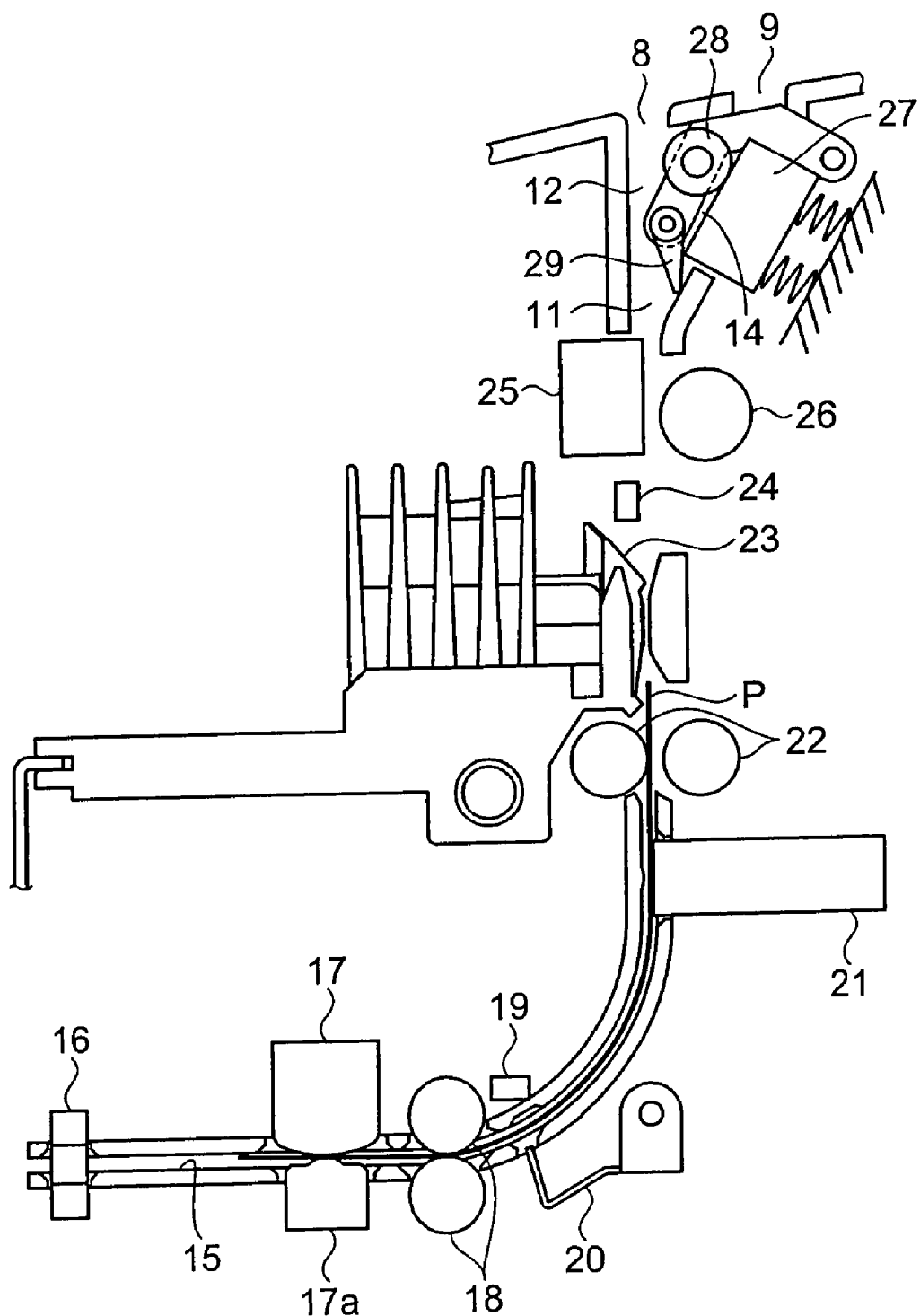
FIG. 15 is a schematic section diagram showing the internal arrangement of the hybrid processing apparatus during MICR processing.
Figure 16:
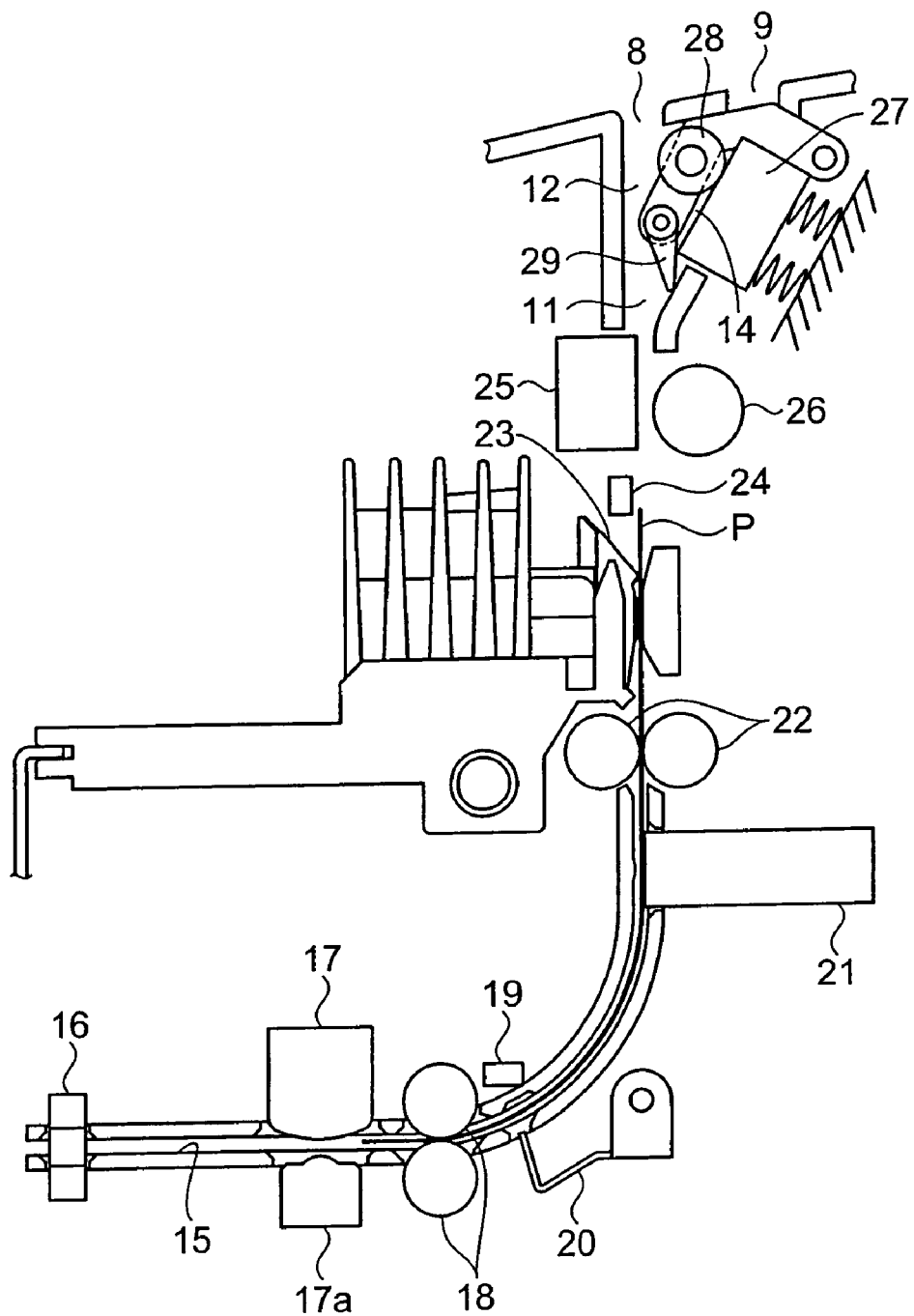
FIG. 16 is a schematic section diagram showing the internal arrangement of the hybrid processing apparatus during printing.
Figure 17:
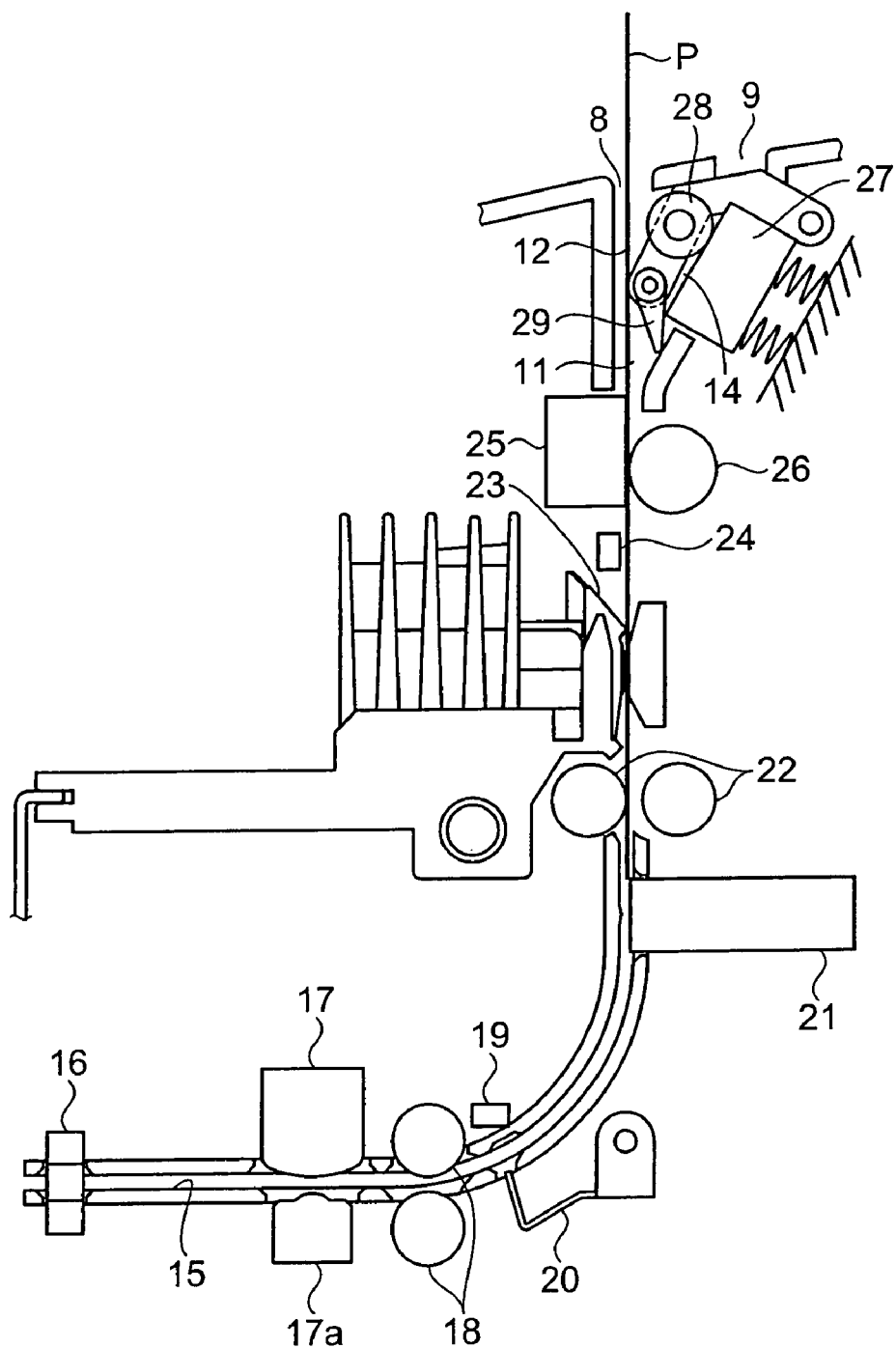
FIG. 17 is a schematic section diagram showing the internal arrangement of the hybrid processing apparatus during scanning when the back is not scanned.
Figure 18:
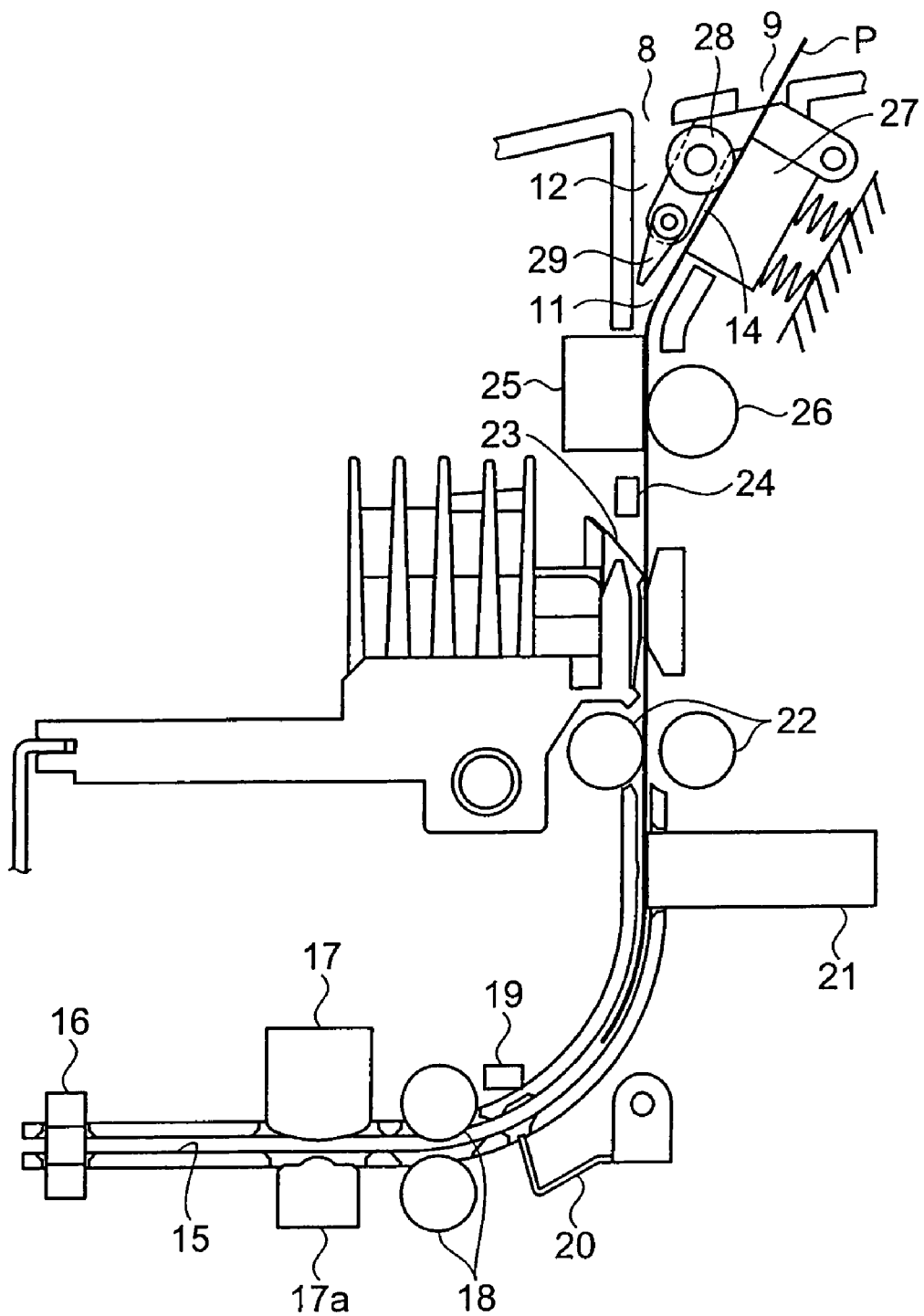
FIG. 18 is a schematic section diagram showing the internal arrangement of the hybrid processing apparatus during scanning when the back is scanned.

FIG. 11 and FIG. 12 are flow charts showing the process executed by the hybrid processing apparatus 10, and FIG. 13 shows the direction of movement and the position of the check P at various steps in this process. Note that the circled numbers in FIG. 13 correspond to the components of the same reference numerals used herein, and the lines extending from those circled numbers denote the approximate positions of those corresponding components. FIG. 14 is a schematic section view of the hybrid processing apparatus 10 when a check is inserted, FIG. 15 is a schematic section view of the hybrid processing apparatus 10 during MICR processing, FIG. 16 is a schematic section view of the hybrid processing apparatus 10 during printing, FIG. 17 is a schematic section view of the hybrid processing apparatus 10 during a scanning operation not including scanning the back of the check (a "back scan" below), and FIG. 18 is a schematic section view of the hybrid processing apparatus 10 during a scanning operation including a back scan.

The hybrid processing apparatus 10 determines if a check P has been inserted and continues looping through step S1 until a check P is inserted (S1). The first transportation roller pair 18 and second transportation roller pair 22 are both held open at this time, and the paper positioning member 20 and front scanner transportation rollers 26 are held closed. If a check P is not inserted (S1 returns no), the hybrid processing apparatus 10 continues to wait. When a check P is inserted from the insertion opening 7, however, the hybrid processing apparatus 10 determines that a check P was inserted based on the detection signals from the trailing end detector 16 and leading end detector 19 (see FIG. 13 (1) and FIG. 14). The check P is manually inserted by the operator until the leading end of the check P contacts the paper positioning member 20, which is closed at this time.

Once a check P is inserted (S1 returns yes), first transportation roller pair 18 is closed (S2), front scanner transportation rollers 26 are opened (S3), the third transportation path 14 is closed so that the second transportation path 12 is used (S4), and the paper positioning member 20 is opened (S5). The transportation motor 66 is then driven to convey the check P toward first paper exit 8 (S6) while the MICR head 17 is driven to read the magnetic ink characters on the check P (S7) (see FIGS. 13 (2) and (3), and FIG. 15).

Note that an optical sensor, mechanical switch with a lever, or other detector could be provided to detect if the front scanner transportation rollers 26 are open or closed so that the operation opening the front scanner transportation rollers 26 in step S3 is executed only if the front scanner transportation rollers 26 are closed.

The transportation path can be selected in step S4 by driving the back scanner feed motor 54 as described above to position the path switching guide 29 so that the first transportation path 15 communicates with the second transportation path 12. An optical sensor, mechanical switch with a lever, or other detector could also be provided on either first unit frame 42a or second unit frame 42b to detect the position of the path switching guide 29 so that the operation of closing the path switching guide 29 (and selecting the second transportation path 12) is executed only when the third transportation path 14 is open (the third transportation path 14 is selected).

After magnetic ink character reading is completed, driving of the transportation motor 66 stops (S8) and the second transportation roller pair 22 is closed (S9). The data read by the MICR head 17 is sent to the host computer 70, which uses the read data to query the bank or other clearinghouse to determine if the check P is valid or invalid. If the result received from the host computer 70 is that the check P is invalid (S10 returns no), the invalid check discharge process (S11) is executed to convey the check P to the first paper exit 8, and control then skips to step S31.

However, if the result received from the host computer 70 is that the check P is valid (S10 returns yes), the transportation motor 66 is driven (S21) and the check P is conveyed toward the exit and positioned to the endorsement printing position (S22) (see FIGS. 13 (4) and (5), and FIG. 16). The check P can be positioned for endorsement printing by, for example, using the position detected by the leading end detector 19 as a reference position, and driving the transportation motor 66 the number of steps needed to convey the check P from this reference position to the endorsement printing start position. Once the check P is positioned for endorsement printing, the end of the check P towards the insertion opening 7 (that is, the trailing end of the check P) is positioned slightly to the insertion opening 7 side of the rear print head 21 as indicated by (5) in FIG. 13.

The transportation motor 66 is then driven to convey the check P toward the insertion opening 7 (S23) while printing the endorsement using the rear print head 21 (S24) (FIGS. 13 (6) and (7)).

This endorsement printing process is then followed by positioning the check P to print the front (S25) (FIGS. 13 (8) and (9)). The check P can be positioned for front printing by using the position detected by one of the paper detectors 16, 19, 24 as a reference position, and then driving the transportation motor 66 the number of steps needed to convey the check P from the reference position to the front printing start position. Once the check P is thus positioned for printing, the check P is located so that the end towards the first paper exit 8 (that is, the leading end) is positioned slightly on the first paper exit 8 side of the front print head 23 as shown at (9) in FIG. 13.

The transportation motor 66 is then driven to convey the check P toward the first paper exit 8 (S26) while the front print head 23 prints the front of the check P (S27) (FIGS. 13 (10) and (11)).

Whether to scan the check P is determined (S28) when the front printing process ends. Whether to scan the check P is controlled by a command from the host computer 70. The host computer 70 sends a command to the hybrid processing apparatus 10 according to operator input to the operating screen. Alternatively, the application program run by the host computer 70 could be programmed to decide whether to scan the check P based on the content of the process or the type of check P, for example, and the application could send scanning commands accordingly. If the check P is not scanned (S28 returns no), the check P is conveyed to the first paper exit 8 and discharged (S29).

Whether the check P was completely discharged by the check discharge process run in step S11 or S29 is then determined (S31), and the operation of conveying the check P to the first paper exit 8 in step S11 or S29 continues until the check P is completely discharged. Whether the check is completely discharged can be determined, for example, by driving the transportation motor 66 the number of steps needed for the insertion opening 7 end (the trailing end) of the check P to reach the second transportation roller pair 22 after the first paper exit 8 end (leading end) of the check P is detected by the paper discharge detector 24.

If the check P was completely discharged (S31 returns yes), driving the transportation motor 66 stops (S32), and the paper positioning member 20 is set to the closed position (S33) so that the next check P can be inserted. The trailing end of the discharged check P is on top of the closed second transportation roller pair 22 and the leading end is exposed from the first paper exit 8. Whether the operator has removed the check P is determined, for example, based on a detection signal from the paper discharge detector 24 (S34). If the check P has been removed (S34 returns yes), the first transportation roller pair 18 and second transportation roller pair 22 are opened, thus opening the first transportation path 15.

If the check P was invalid (S10 returns no) or is not scanned (S28 returns no), processing ends.

However, if the check P is to be scanned (S28 returns yes), transportation motor 66 is driven to convey the check P towards the insertion opening 7 (S41) and position the check P to the scanning start position (S42) (FIGS. 13 (12) and (13)). The check P can be positioned to the scanning start position by, for example, using the position detected by a specific paper detector 16, 19, 24 as a reference position and driving the transportation motor 66 the number of steps needed to convey the check P from this reference position to the scanning start position. When the check P is positioned for scanning, the end on the first paper exit 8 side (the leading end) is positioned slightly removed towards the first paper exit 8 from the position where the front scanner transportation rollers 26 contact the front scanner 25.

The front scanner transportation rollers 26 then close (S43) and the first transportation roller pair 18 and second transportation roller pair 22 open (S44) in preparation for scanning, and whether the front is to be scanned (S45) or the back is to be scanned (S46) is determined. Whether the front or the back is scanned is based on a command received from the host computer 70 as described in step S28 above.

If both front and back are to be scanned (S45 returns yes, S46 returns yes), the back scanner feed motor 54 is driven so that the back scanner transportation roller 28 turns in the direction conveying the check P toward the second paper exit 9 (S51). This causes the path switching guide 29 to move to the position closing the second transportation path 12. At this time the check P has not reached the position of the back scanner transportation roller 28 and the conveyance force of the back scanner transportation roller 28 does not act on the check P. The path switching guide 29 also does not interfere with the check P and is not prevented from pivoting.

The front scanner feed motor 38 is then driven so that the front scanner transportation rollers 26 convey the check P toward the paper exit (S52) while the front scanner 25 scans the face of the check P (S53).

The end of the check P scanned by the front scanner 25 then contacts the path switching guide 29 and is guided into the third transportation path 14 where the back scanner 27 resides (FIG. 9A, FIG. 13 (14)). When the leading end of the check P reaches the back scanner transportation roller 28, the back scanner transportation roller 28 conveys the check P toward the second paper exit 9 while the back scanner 27 images the back of the check P (S54).

The back scanner 27 starts scanning the back of the check P when the leading end of the check P reaches scanner contact point D, and thus proceeds parallel to the front scanner 25 scanning part of the check P (FIG. 13 (16), FIG. 18)).

If only the front of the check P is scanned (S45 returns yes, S46 returns no), the front scanner transportation rollers 26 rotate to convey the check P towards the first paper exit 8, and the front scanner feed motor 38 is driven (S55) (FIG. 13 (14)). The back scanner feed motor 54 remains stopped and the path switching guide 29 is held in the position closing the third transportation path 14 (see FIG. 9B). The front scanner 25 then scans the front of the check P (S56) and the check P travels through the second transportation path 12 and is discharged from the first paper exit 8 (FIG. 13 (15), FIG. 17).

If only the back of the check P is scanned (S45 returns no), the back scanner feed motor 54 is driven and the path switching guide 29 is positioned to close the second transportation path 12 (S57), the front scanner transportation rollers 26 convey the check P toward the second paper exit 9 (S58), and the back scanner 27 scans the back of the check P as the check P is conveyed by the back scanner transportation roller 28 (S59) similarly to steps S51, S52, and S54 described above.

Whether scanning the check P is completed is then determined (S61). If scanning is completed, the motor being driven at that time, either front scanner feed motor 38 or back scanner feed motor 54, stops, and the paper positioning member 20 closes. Whether scanning is completed can be determined, for example, by determining if the front scanner feed motor 38, has or the front and back scanner feed motors 38 and 54, have driven the number of steps needed for the trailing end of the check P to travel from the scanning start position in step S42 to the front scanner transportation rollers 26 or back scanner transportation roller 28.

As a result of the foregoing process, the hybrid processing apparatus 10 can read magnetic ink characters on the check P, verify if the check P is valid, print the front and back of the check, and scan the front and back sides of the check in a single continuous operation.

The effect of a hybrid processing apparatus 10 according to this embodiment of the invention is described below.

By having both a front scanner 25 for scanning the front of a check P and a back scanner 27 for scanning the back of the check P, this hybrid processing apparatus 10 can scan both the front and back sides of the processed medium substantially simultaneously, and can thus shorten the total processing time. Furthermore, both front and back side can be scanned and imaged with the check P inserted only once to the hybrid processing apparatus 10 for processing.

The back scanner 27 is positioned facing the third transportation path 14, and a path switching guide 29 for selectively communicating the second transportation path 12 or third transportation path 14 with the first transportation path 15 is rendered at the divergence point 11 between the second transportation path 12 and third transportation path 14. Therefore, by communicating the second transportation path 12 with the first transportation path 15 when the back scanner 27 is not used for scanning, the check P is conveyed without passing through the third transportation path 14 to which the back scanner 27 is disposed. The hybrid processing apparatus can thus be rendered more compactly because a retraction mechanism for retracting the back scanner transportation roller 28 from the back scanning surface 27a of the back scanner 27 is not needed in order to convey the check P when the check P is not scanned by the back scanner 27. The hybrid processing apparatus 10 can also use the front and back print heads 23, 21 to print on single sheets other than checks P, in which case paper jams caused by the back scanner unit 50 can be prevented if the processed medium is conveyed through the second transportation path 12 and discharged from the first paper exit 8.

When only the front is scanned, the check P passes through the second transportation path 12 and is discharged from the first paper exit 8. When both front and back are scanned, the check P passes through the third transportation path 14 and is discharged from the second paper exit 9. Whether only the front was scanned or both the front and back were scanned can thus be easily determined based on the paper exit from which the check P is discharged.

The path switching guide 29 pivots with the rotation of the guide gear 46, which transfers rotation of the back scanner feed motor 54 output shaft to the back scanner transportation roller 28. A separate power source for driving the path switching guide 29 is therefore not necessary and the hybrid processing apparatus is simplified, thus affording a more compact hybrid processing apparatus. Furthermore, because the path switching guide 29 pivots in conjunction with the scanning operation of the back scanner 27 (driving the back scanner transportation roller 28), the check P can be reliably guided into the third transportation path 14 for back scanning.

One end of the first unit frame 42a and second unit frame 42b is axially supported on the scanner unit base 52 so that the unit frames rock freely on the support pins, and the feed roller unit 40 can move to and away from the back scanner 27. This arrangement makes it simple to separate the feed roller unit 40 from the back scanner 27 for cleaning the back scanning surface 27a. If a paper jam occurs in the second transportation path 12 or third transportation path 14, the check P can also be easily removed.

The present invention shall not be limited to the foregoing embodiment of the invention, and variations and modifications will be readily apparent to one with ordinary skill in the related art.

For example, the host computer that controls the hybrid processing apparatus 10 could be a POS terminal or a dedicated host computer for controlling the hybrid processing apparatus 10. A controller having the functions of the host computer could also be built in to the hybrid processing apparatus 10.

Captured data is also stored in the host computer above, but memory could be provided in the hybrid processing apparatus for storing the data locally.

Yet further, the foregoing hybrid processing apparatus 10 has both a rear print head 21 and front print head 23 for printing the check P, but print heads are not essential. More particularly, the front and back of the check could be written or recorded manually. Alternatively, the hybrid processing apparatus could have only a front print head 23 and the check could be manually endorsed.

The locations of the front print head 23, rear print head 21, front scanner 25, and back scanner 27 can also be arranged as desired according to the medium that is processed by the hybrid processing apparatus 10, for example.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A scanner unit comprising:
   a scanner for imaging a print medium;
   a base which supports the scanner;
   a pressure feed roller disposed opposite the scanning surface of the scanner;
   a guide member for guiding the print medium to the scanner;
   a frame member which supports the pressure feed roller and guide member, and is supported pivotably to the base; and
   a motor which is supported on the base and drives the pressure feed roller.

2. The scanner unit of claim 1, further comprising an urging member for urging the scanner toward the pressure feed roller.

3. The scanner unit of claim 1, further comprising an urging member for urging the frame so that the pressure feed roller supported on the frame is urged toward the scanning surface of the scanner.

4. The scanner unit of claim 1, wherein the guide member is pivotably supported on the frame member.

5. The scanner unit of claim 4, further comprising:
   a guide shaft for pivotably supporting the guide member;
   a guide gear disposed on the guide shaft;
   a roller gear which is disposed on the roller shaft of the pressure feed roller and meshes with the guide gear; and
   a transfer gear which transfers drive power from the motor to the guide gear and roller gear, and meshes with either the roller gear or guide gear.

6. The scanner unit of claim 1, wherein the frame member rotates freely relative to the base such that the pressure feed roller moves relative to the scanner.

* * * * *